United States Patent
Gustafson et al.

(10) Patent No.: US 6,331,835 B1
(45) Date of Patent: Dec. 18, 2001

(54) DEEPLY-INTEGRATED ADAPTIVE GPS-BASED NAVIGATOR WITH EXTENDED-RANGE CODE TRACKING

(75) Inventors: Donald E. Gustafson, Waltham; John R. Dowdle, Arlington; John M. Elwell, Jr., Sudbury, all of MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 0 days.

(21) Appl. No.: 09/437,087

(22) Filed: Nov. 9, 1999

Related U.S. Application Data

(60) Provisional application No. 60/118,291, filed on Feb. 2, 1999.

(51) Int. Cl.$^7$ ............................................ H04B 7/185
(52) U.S. Cl. ............................... 342/357.06; 342/357.01; 701/213
(58) Field of Search .................. 342/357.06, 357.12, 342/357.01, 352; 701/213, 214, 217, 300

(56) References Cited

U.S. PATENT DOCUMENTS

| | | | |
|---|---|---|---|
| 4,754,283 | * 6/1988 | Fowler | 342/461 |
| 5,117,232 | 5/1992 | Cantwell . | |
| 5,343,209 | * 8/1994 | Sennott et al. | 342/357 |
| 5,672,872 | * 9/1997 | Wu et al. | 250/330 |
| 5,706,394 | * 1/1998 | Wynn | 395/2.28 |
| 5,721,754 | * 2/1998 | Chen | 375/227 |
| 5,768,473 | * 6/1998 | Eatwell et al. | 395/2.35 |
| 5,991,525 | * 11/1999 | Shah et al. | 395/500.23 |
| 6,002,708 | 12/1999 | Fleming et al. . | |
| 6,047,017 | 4/2000 | Cahn et al. . | |
| 6,064,689 | 5/2000 | Vollmer et al. . | |
| 6,078,796 | * 6/2000 | Ling | 455/234.1 |
| 6,081,230 | 6/2000 | Hoshino . | |
| 6,081,547 | 6/2000 | Miya . | |
| 6,088,383 | 7/2000 | Suzuki et al. . | |
| 6,088,653 | 7/2000 | Sheikh et al. . | |
| 6,108,610 | * 8/2000 | Winn | 702/77 |

OTHER PUBLICATIONS

Wilde, A., "Extended Tracking Range Delay–Locked Loop", ICC 1995, Seattle, 'Gateway to Globilization', 1995 IE International Conference in Communications, 1995, vol. 2, pp. 1051–1054.

Wilde, A., "Delay–Locked loop with Correlation Branch Selection", Global Telecommunications Conference, 1997, vol. 2, pp. 614–618.

Frank, et al., Collins Next Generation Digital GPS Receiver, Position Location and Navigation Symposium, 1990. Record. The 1990's—A Decade of Excellence in the Navigation Sciences. IEEE Plans 1990, IEEE, 1990. pp. 286–292.

Jazwinski, A. H., Stochastic Processes And Filtering Theory, Chpt. 6 Nonlinear Filtering Theory, Academic Press, p. 162–93, 1970.

\* cited by examiner

*Primary Examiner*—Dao Phan
(74) *Attorney, Agent, or Firm*—McDermott, Will & Emery

(57) ABSTRACT

A system and method for generating a multidimensional navigation solution utilizes Global Positioning System (GPS) data to obtain highly reliable and accurate navigational solutions in high interference and dynamic environments, at a performance level which has been heretofore unattainable. Additional sensors such as inertial (gyros and accelerometers), altimeters, radars, etc. may be employed in a deeply integrated configuration. The approach taken in the present invention differs from that of previous techniques through its exploitation of nonlinear filtering methods; as a result, the navigation system architecture and processes employed yield significant improvements in navigation system performance, both in code tracking and reacquisition, and in carrier tracking and reacquisition. The improvements are particularly significant at low signal/noise ratios, where conventional approaches are especially susceptible to loss of code lock or carrier lock.

101 Claims, 9 Drawing Sheets

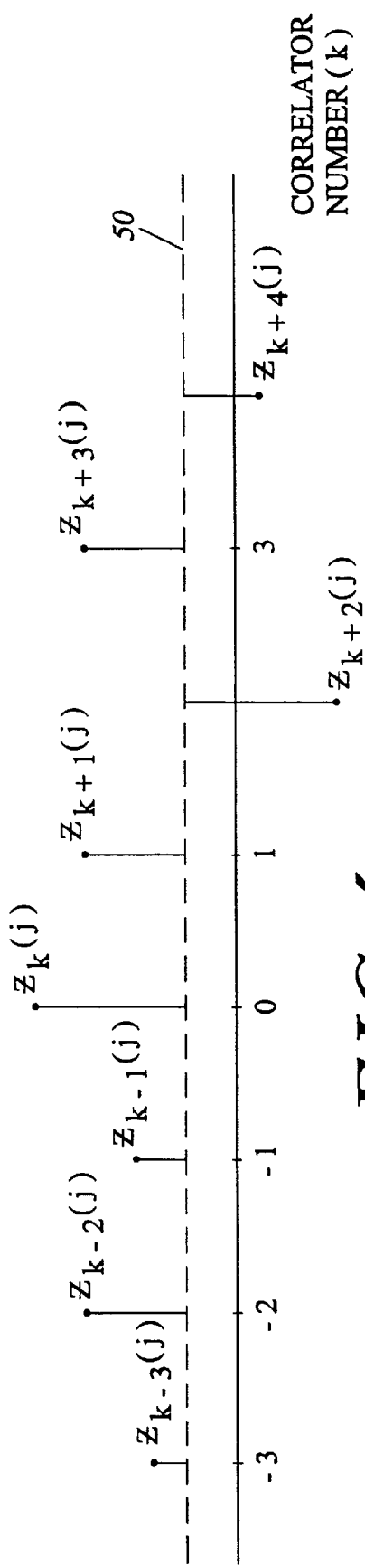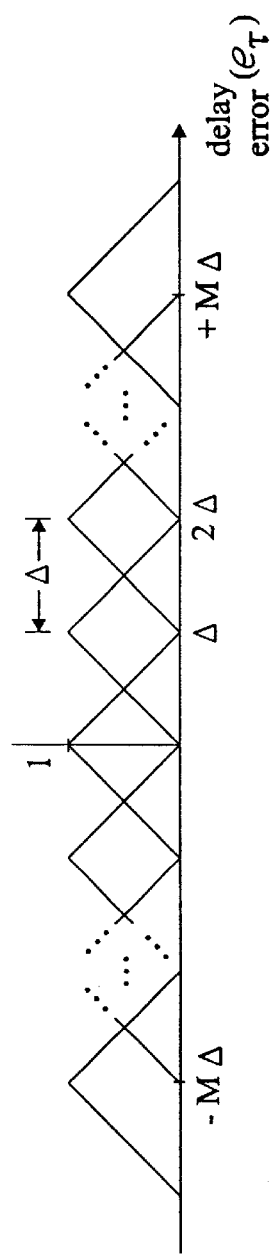
FIG. 4
FIG. 3

DEEPLY-INTEGRATED ADAPTIVE GPS-BASED NAVIGATOR WITH EXTENDED-RANGE CODE TRACKING

This application claim benefit to provisional application 60/118,291 Feb. 2, 1999.

BACKGROUND OF THE INVENTION

Contemporary navigation systems commonly employ satellite navigation data derived from radio navigation receivers to determine the location of a navigation platform. The satellite data is often augmented by data from additional sensors in order to improve navigation system performance in situations where satellite data may be available only intermittently or may be degraded by intentional or unintentional interference. For example, data from inertial sensors (accelerometers and gyros) may be used to allow full navigation solutions (position, velocity and attitude) to be maintained in the presence of satellite data dropouts over extended periods of time. Radio navigation data is generated by receivers specifically designed to receive and process radio signals transmitted from a plurality of space-based or ground-based terminals. The navigation sensors are generally, but need not be, collocated on the same navigation platform. Depending on the application, the navigation system objective may be to determine position only, position and velocity, or a larger set of parameters which may include navigation platform attitude. If required, the satellite navigation data can be used to perform error calibration of the other sensors, thereby reducing navigation system errors when the satellite data are temporarily unavailable or corrupted by interference.

Radio navigation data are processed in order to determine the line-of-sight distance of the navigation base from each transmitter in view of the receiver. This is accomplished by measuring the time of arrival of each signal, and comparing it to the known time of transmission, using a common time reference. Contemporary radio navigation receivers used for this purpose generally include an antenna for receiving the radio signals, a front-end for amplifying, down-converting and bandpass-filtering the received signals, an analog-to-digital converter, and a signal processor. It is common practice in such receivers to generate in-phase (I) and quadrature (Q) baseband signals, which are then processed to remove noise and interference.

Noise and interference are often reduced significantly by means of spread spectrum techniques in which the transmitted signal is modulated by a known pseudo-random code. The receiver correlates the received signal with a locally-generated replica of the code and performs code tracking by varying the estimated time delay to maintain the correlation at or near its peak value. In this manner, a significant improvement in signal-to-noise ratio is obtained. If the input signal-to-noise ratio is sufficiently high, then it is possible to perform carrier phase tracking. Successful carrier tracking yields navigation accuracies which are greater than those achievable using code tracking only.

The NAVSTAR Global Positioning System (GPS), developed by the United States Government, is an example of a contemporary radio navigation system. A constellation of up to 24 satellites, positioned in precisely-known orbits, transmit pseudo-random ranging signals used by specially-designed receivers to calculate line-of-sight distance from the user receiver to any satellite in view of the receiver. Based on this information, a navigation solution can be obtained.

In modern GPS-based navigation systems, interference can have adverse effects on GPS receiver code and carrier tracking, resulting in degraded navigation system performance. Interference can be intentional or unintentional. Examples of unintentional interference include: (1) out-of-band signals from nearby transmitters with inadequate radio-frequency (rf) filtering, (2) harmonic or intermodulation products of various ground and airborne transmitters, (3) active or passive intermodulation products of signals or local oscillators on the same platform as the GPS receiver or on nearby platforms, (4) pulsed interference from radar signals in nearby frequency bands, (5) accidental interference from unlicensed transmitters. The results of interference are a reduction in signal-to-noise ratio (SNR) at the receiver input. The transmitted GPS signal may be further attenuated by trees, buildings, etc., resulting in a further reduction of SNR. Sources of intentional interference include narrow-band and wideband jammers specifically designed to reduce SNR at the receiver input.

Current GPS satellites transmit on two frequencies, L1=1575.42 MHZ and L2=1227.6 MHZ. The satellites transmit their signals using spread spectrum techniques and employ two different spreading functions: (1) a 1.023 MHZ coarse/acquisition (C/A) code on L1 only and (2) a 10.23 MHZ precision P(Y) code on both L1 and L2. The minimum signal power for received GPS signals is specified as follows; for L1, C/A=−160 dBW (decibels with respect to one Watt), P=−163 dBW; for L2, P=−166 dBW. A typical value of equivalent received thermal noise power is −131 dBW. Thus, recovery of the GPS signal, even with no interference, cannot be accomplished without special design techniques such as spread spectrum.

As described above, the GPS signal is broadcast using standard spread spectrum techniques in which the narrow bandwidth signal is spread to a much larger bandwidth by using a pseudo-random code. By correlating the received signal with a known replica of the pseudo-random code and then bandpass filtering the result over the narrow signal bandwidth, the effects of interference are significantly reduced. The gain in SNR due to spread spectrum processing is on the order of 53 dB for P(Y)-code and 43 dB for C/A code in a 50 Hz bandwidth.

Outputs from other navigation sources, (for example inertial navigation system (INS) outputs, radars, altimeters, etc . . . ) are often combined with GPS navigation system outputs to provide navigation solutions which are improved over those resulting from systems which employ either one used independently. These outputs assist in maintaining an accurate navigation solution over limited time intervals during periods of GPS dropout. The INS is also used to aid the GPS receiver in the presence of large platform accelerations, enabling narrow tracking filter bandwidths.

Current GPS-based navigation system architectures can be categorized generally as "loosely coupled" or "tightly coupled". A loosely coupled system, for example, may combine the navigation solution generated by a GPS receiver (position, velocity, time) with the navigation solution provided by an INS navigation system (position, velocity, attitude) using a weighting scheme generally based on a Kalman filter. A minimum of four satellites are required to obtain the GPS navigation solution. A tightly-coupled system computes pseudorange and, deltarange (integral of Doppler velocity) measurements obtained by a GPS receiver, and for example, combines them with the INS navigation solution. A tightly-coupled system offers the advantage of obtaining a navigation solution with less than four satellites in view.

Vulnerability of current GPS receivers to interference has resulted in various designs for interference suppression which generally involve the use of patch antennas and/or specialized signal processors placed in front of the receiver input. Another approach uses aiding signals from inertial and/or other sensors to allow carrier/code tracking at narrow bandwidths in highly dynamic regimes such as aircraft. These methods may be regarded as ad hoc, since they only attempt to modify current systems at easily accessible points within the system. As a result, current systems are far from optimal in terms of interference rejection and navigation accuracy. There is a need for a fully integrated design which achieves near-optimal performance.

SUMMARY OF THE INVENTION

The present invention is directed to an apparatus and method for obtaining reliable and accurate GPS-based navigation solutions (optimal estimates of current position, time and/or other parameters such as velocity and attitude, as appropriate to the problem at hand) in high interference and dynamic environments, at a performance level which has heretofore been unobtainable.

The philosophy of the approach taken in the present invention differs from that of previous techniques; as a result, the navigation system architecture and processes employed yield significant improvements in navigation system performance, both in code tracking and reacquisition, and in carrier tracking and reacquisition. The improvements are particularly significant at low signal/noise ratios, where conventional approaches are especially susceptible to loss of code lock or carrier lock.

The present invention approaches the problem as a navigation problem, where the overall goal is to calculate an optimal, or "best", estimate of the components of a specified navigation state vector, given an initial estimate of the state vector and the past history of measurements. The measurements to be used are referred to herein as "raw" measurements, consisting of a least in-phase (I) and quadrature (Q) data obtained from one or more correlators operating on received GPS signals. Additional navigation sensors may be used, depending on the application at hand, to enhance navigation system performance. These sensors include, but are not limited to, inertial sensors (gyros and accelerometers), altimeters, radars and electro-optical devices. By using the "raw" measurements from all of the sensors, potential loss of information due to preprocessing operations is prevented.

In a preferred embodiment, the "best" estimate is the minimum variance estimate, which is the conditional mean of the state vector, conditioned on the past measurement history. The state vector estimate is updated based on the use of nonlinear stochastic differential equations for propagating the first two conditional moments of the state vector, given the past measurement history. Determination of the first conditional moment, otherwise referred to as the conditional mean, requires knowledge of the second conditional moment, which is represented by the estimation error covariance matrix. The conditional mean and error covariance matrix estimates are calculated recursively in real time in the navigation filter described herein.

The technique of the present invention is not dependent in any manner on a priori notions of tracking filters, phase lock loops, delay lock loops, and the like, which are commonly used. Instead, the navigation system architecture and processes flow naturally from the problem description and the characterization of the measurements from GPS and other sensors. This leads to an architecture which is amenable to single processor integration, eliminating the modular (and sub-optimal) architectures of current designs.

The resulting navigation filter processes are significant departures from traditional Kalman and extended Kalman filter algorithms generally used for GPS-based navigation. The differences arise principally from the fact that the measurement functions are highly nonlinear. Whereas previous designs rely on linearization techniques, the present invention takes full account of measurement nonlinearities. As a result, the error covariance matrix is driven by the measurements and the state vector gain matrix is a nonlinear function of the estimated error covariance matrix.

A bank of correlators and a processing architecture based on nonlinear estimation techniques are employed to maintain code track through extremely high jamming environments. The number of correlators are optionally extendable, to allow for optimal code loop reacquisition following GPS signal dropout, eliminating the need for time-consuming reacquisition as employed by conventional direct-search techniques. The outputs of each correlator in the correlator bank are preferably weighted to provide a fully optimized navigation solution.

The present invention extends the range of delay error beyond the linear range through the use of multiple correlators. The number of correlators is arbitrary. The need for moding logic, which depends on estimated carrier/noise ($C/N_0$) ratio is eliminated. Current receivers employ fixed gain filters, depending on the mode of operation. The present invention, however, allows for seamless operation at any $C/N_0$ ratio, and therefore, mode switching logic is not required.

In a first embodiment, the present invention is directed to a system for determining a multidimensional navigation state for a navigation platform based on radio navigation data transmitted by external terminals. A radio navigation data receiver receives and amplifies the radio navigation data, which arrives embedded in noise. An extended-range bank of correlators extract the radio navigation data from the noise over an extended range of delay error. The correlators process the radio navigation data and noise to generate output functions indicative of the degree of correlation for each correlator in the extended-range bank between the radio navigation data and a known internally-generated replica signal. An estimator estimates the radio navigation data signal power and noise power from the correlator output functions. A measurement update unit updates the navigation state estimate based on the estimated radio navigation data signal and noise power estimates and the correlator outputs.

In a second embodiment, the present invention is directed to a system for determining a multidimensional navigation state for a navigation platform based on radio navigation data transmitted by external terminals and based on inertial data indicative of the inertial behavior of the platform. A radio navigation data receiver receives and amplifies the radio navigation data, which arrives embedded in noise. An extended-range bank of correlators extract the radio navigation data from the noise over an extended range of delay error. The correlators process the radio navigation data and noise to generate correlator output functions indicative of the degree of correlation for each correlator in the extended-range bank between the radio navigation data and a known internally-generated replica signal. An estimator estimates the radio navigation data signal power and noise power from the correlator output functions. An inertial sensor unit generates inertial data indicative of the inertial behavior of the platform. A measurement update unit updates the navigation state based on the estimated radio navigation data signal power and noise power, the correlator outputs, and the inertial data.

The radio navigation data preferably comprises Global Positioning System (GPS) data, and the radio navigation data receiver comprises a GPS receiver. The system preferably further includes a propagator for applying sensed inertial data to a dynamic model based on a recently updated navigation state to generate updated inertial data, which is in turn provided to the measurement update unit. The multi-dimensional navigation state may include, for example, information related to platform position, velocity, and attitude, receiver clock errors, inertial sensor errors, propagation delays, and satellite errors.

In a preferred embodiment, the measurement update unit updates the navigation state by calculating the conditional moments of the navigation state based on the estimated radio navigation data signal power and noise power, the correlator outputs, and the inertial data.

The conditional moments may comprise a first conditional moment comprising a conditional mean, and a second conditional moment comprising a conditional error covariance matrix. The conditional moments are preferably calculated to include measurement non-linearities.

The estimator preferably comprises a signal power estimator for determining radio navigation data signal power based on a nonlinear conditional moment of the navigation state, and a noise power estimator for estimating noise power based on a nonlinear conditional moment of the navigation state, and the signal power estimate.

In a third aspect, the present invention is directed to a system for determining a multidimensional navigation state for a navigation platform based on radio navigation data transmitted by external terminals. A radio navigation data receiver receives and amplifies the radio navigation data, which is embedded in noise. A bank of correlators extract the radio navigation data from the noise over a range of delay error. The correlators process the radio navigation data and the noise to generate correlator output functions indicative of degree of correlation for each correlator between the radio navigation data and a known internally-generated replica signal. An estimator estimates the radio navigation data signal power and noise power from the correlator output functions. A measurement update unit updates the navigation state based on the conditional moments of the navigation state calculated as a function of the estimated radio navigation data signal power and noise power, and the correlator output functions.

In a preferred embodiment, the third aspect of the present invention further comprises an inertial sensor unit for generating inertial data indicative of the inertial behavior of the platform. In this embodiment, the conditional moments of the navigation state are preferably further calculated as a function of the inertial data. The conditional moments preferably comprise a first conditional moment comprising a conditional mean, and a second conditional moment comprising a conditional error covariance matrix. The conditional moments are preferably calculated to include measurement non-linearities. The bank of correlators preferably comprise an extended-range bank of correlators for extracting the radio navigation data from the noise over an extended range of delay error.

In a fourth aspect, the present invention is directed to an estimator for estimating signal and noise power in a system for determining a multidimensional navigation state for a navigation platform based on radio navigation data embedded in noise. The radio navigation data signal is received by a radio navigation data receiver including a bank of correlators for extracting the radio navigation data from the noise over a range of delay error. The correlators process the radio navigation data and the noise to generate correlator output functions indicative of the degree of correlation for each correlator between the radio navigation data and a known internally-generated replica signal. The estimator includes a signal power estimator for determining radio navigation data signal power based on a conditional moment of the navigation state, a noise power estimator for estimating noise power based on a conditional moment of the navigation state, and the signal power estimate.

In a preferred embodiment of the fourth aspect of the present invention, the estimator further includes a bias estimator for determining a bias estimate of each correlator in the bank. In this arrangement, the signal power estimate and noise power estimate are further based on the bias estimate. The bias estimator preferably comprises a smoothing function for updating the bias estimate of each correlator according to a smoothing time constant; and a minimum function for determining the bias estimate as the minimum value of the smoothed bias estimates.

The conditional moment preferably comprises a first conditional moment comprising a conditional mean, calculated by means of a nonlinear filter. The resulting noise power estimate preferably comprises a vector, such that an independent noise power estimate is calculated for each correlator in the correlator bank. The bank of correlators preferably comprises an extended-range bank of correlators for extracting the radio navigation data from the noise over an extended range of delay error. An inertial sensor unit is preferably included for generating inertial data indicative of the inertial behavior of the platform. The conditional moment of the navigation state is preferably further calculated as a function of the inertial data.

In a fifth aspect, the present invention is directed to a measurement update unit for updating the navigation state and error covariances of the navigation state for a navigation platform based on radio navigation data embedded in noise. The radio navigation data signal is received by a radio navigation data receiver including a bank of correlators for extracting the radio navigation data from the noise over a range of delay error. The correlators process the radio navigation data and the noise to generate correlator output functions indicative of degree of correlation for each correlator between the radio navigation data and a known internally-generated replica signal. A state update unit updates the navigation state as a function of the correlator output functions weighted by state gain functions. The state gain functions are based on conditional moments of nonlinear functions of the navigation state, and an inertial data propagation of a previous error covariance of the navigation state. An error covariance matrix update unit updates the error covariance of the navigation state based on conditional moments of nonlinear functions of the navigation state, and further based on estimates of the radio navigation data signal power and noise power.

In a preferred embodiment, the conditional moments comprise statistical expectations of nonlinear functions of the line-of-sight position error for each satellite in view.

According to the fifth aspect, the bank of correlators preferably comprises an extended-range bank of correlators for extracting the radio navigation data from the noise over an extended range of delay error. The radio navigation data signal power estimate and noise power estimate are preferably calculated by an estimator comprising a signal power estimator for determining radio navigation data signal power based on a conditional moment of the navigation state; and a noise power estimator for estimating noise power based on a conditional moment of the navigation state, and the signal power estimate.

In a sixth aspect, the present invention is directed to a measurement update unit for updating the navigation state and error covariances of the navigation state for a navigation platform based on radio navigation data carried on a radio navigation data carrier signal embedded in noise. The radio navigation data signal is received by a radio navigation data receiver including a bank of correlators for extracting the radio navigation data from the noise over a range of delay error. The correlators process the radio navigation data and the noise to generate correlator output functions indicative of degree of correlation for each correlator between the radio navigation data and a known replica signal. The bank of correlators include a prompt correlator for processing radio navigation data signals near the radio navigation data code offset. The measurement update unit comprises a state update unit and an error covariance matrix update unit. The state update unit updates the navigation state as a function of the prompt correlator output function weighted by state gain functions. The state gain functions are based on conditional moments of a non-linear function of line-of-sight error of the radio navigation data, and an error covariance matrix. The error covariance matrix update unit updates the error covariances of the navigation state based on the state gain functions.

In a preferred embodiment of the sixth aspect of the present invention, the state gain functions are further based on estimates of the radio navigation data carrier signal power and noise power, a data bit estimate, an inertial data propagation of a previous navigation state, and an error covariance matrix. Noise power is preferably calculated based on the average noise power and at least two non-prompt correlator output functions. The state update unit and error covariance matrix update unit preferably operate linearly for a relatively large radio navigation data carrier signal power to noise power ratio and operate non-linearly for a relatively small radio navigation data carrier signal power to noise power ratio.

In a seventh aspect, the present invention is directed to a measurement update unit for updating the navigation state and error covariances of the navigation state for a navigation platform based on radio navigation data embedded in noise. The radio navigation data signal is received by a radio navigation data receiver including a bank of correlators for extracting the radio navigation data from the noise over a range of delay error. The correlators process the radio navigation data and the noise to generate correlator output functions indicative of degree of correlation for each correlator between the radio navigation data and a known replica signal. The measurement update unit comprises a state update unit, an error covariance matrix update unit, and an integrity management unit. The state update unit updates the navigation state as a function of the correlator output functions weighted by state gain functions. The state gain functions are based on conditional moments of a non-linear function of line-of-sight error of the radio navigation data, an internal data propagation of a previous navigation state, and an error covariance matrix. The error covariance matrix update unit updates the error covariances of the navigation state based on conditional moments of a non-linear function of line-of-sight error. The integrity management unit maintains the integrity of the navigation state and the error covariance.

In a preferred embodiment of the seventh aspect, the state gain functions and error covariances of the navigation state are further based on estimates of the radio navigation data signal power and noise power. The conditional moments preferably comprise non-linear functions of a line-of-sight error variance, in turn a function of the error covariance of the navigation state, and the integrity management unit preferably monitors and limits the signal and noise power values. The integrity management unit preferably further limits growth rate of the error covariances. Inertial data is preferably sensed by inertial data sensors and the growth rate of the error covariances are limited to an upper bound based on estimated accuracy of the inertial sensors. The integrity management unit may further monitor and maintain the positive-definiteness of the error covariance matrix, and may further limit estimated change of the navigation state.

The invention is amenable to a variety of commercial applications that rely on GPS navigation, including airliners, nautical vessels, personnel, and automobiles.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a plot of multiple correlator functions in the extended range correlator bank, as a function of delay error $e_\tau$, in accordance with the present invention, using ½ chip spacing.

FIG. 4 is a plot of exemplary correlator measurement data $z(j,k)$ as generated by the bank of k correlators, at each sample period j, in accordance with the present invention.

DETAILED DESCRIPTION OF THE PREFERRED EMBODIMENTS

I—Overview

GPS code tracking employs knowledge of transit time and the speed of light to determine relative position along the satellite-to-receiver line-of-sight to enable specified worldwide navigation accuracies of approximately 100 meters (95% probability) for civilian C/A code and approximately 20 meters for dual-frequency P(Y) code. These accuracies are often exceeded in practice. Navigation errors may be reduced to approximately 1 meter if nearby GPS transmitters, such as pseudolites, are employed to eliminate propagation errors.

Carrier tracking is maintained in modem systems using Doppler (velocity) measurements which reflect a change in the received signal carrier frequency. If the interference environment is benign, then carrier tracking may be used to achieve accuracies even greater than those achievable by code tracking, on the order of 1 centimeter. However, the carrier tracking threshold is approximately 15 dB below the code tracking threshold, making carrier tracking less reliable than code tracking.

Figure 1A:
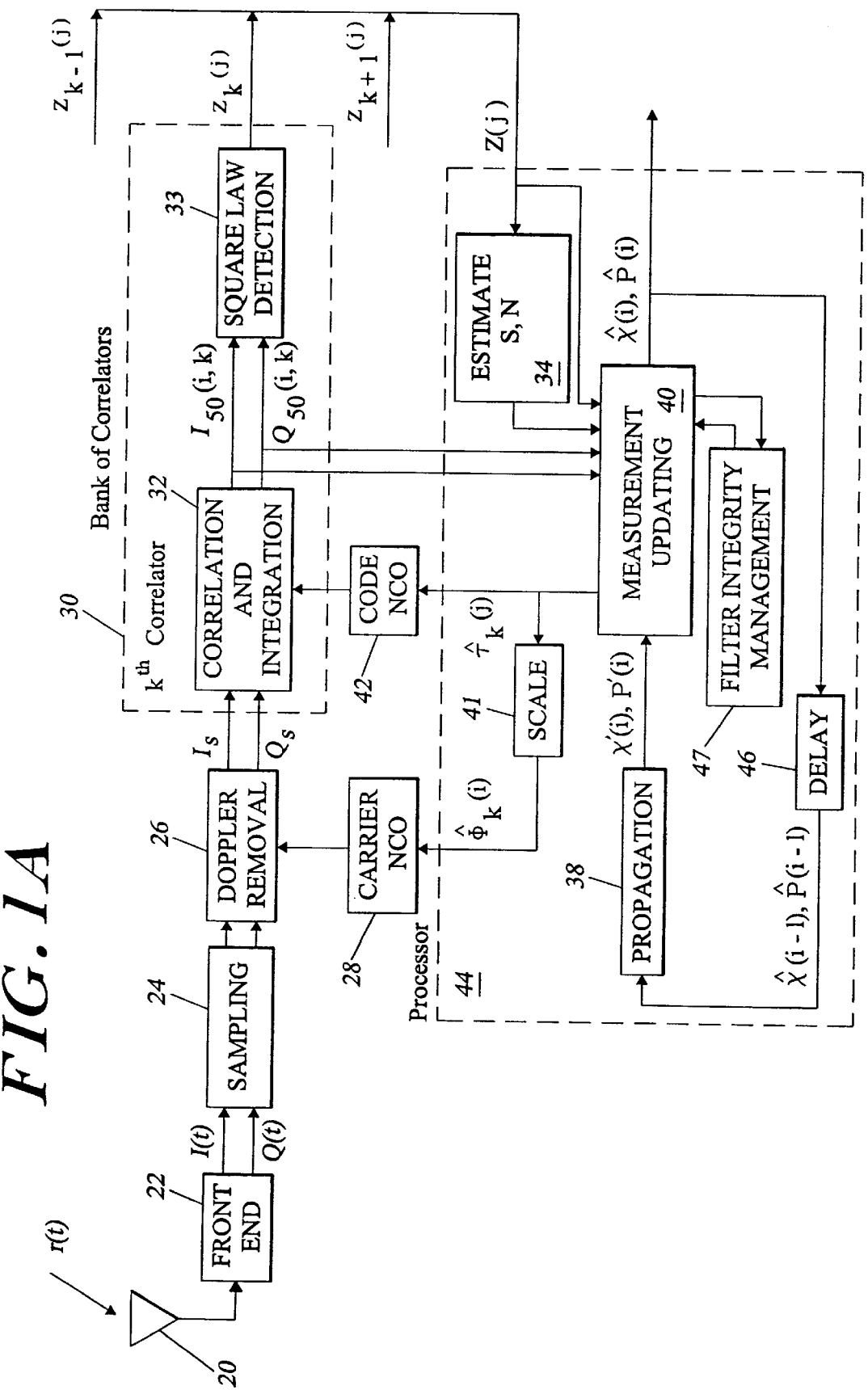
FIG. 1A is a schematic block diagram of a navigation system employing GPS code and carrier tracking to provide a navigation solution, in accordance with the present invention.
Figure 1B:
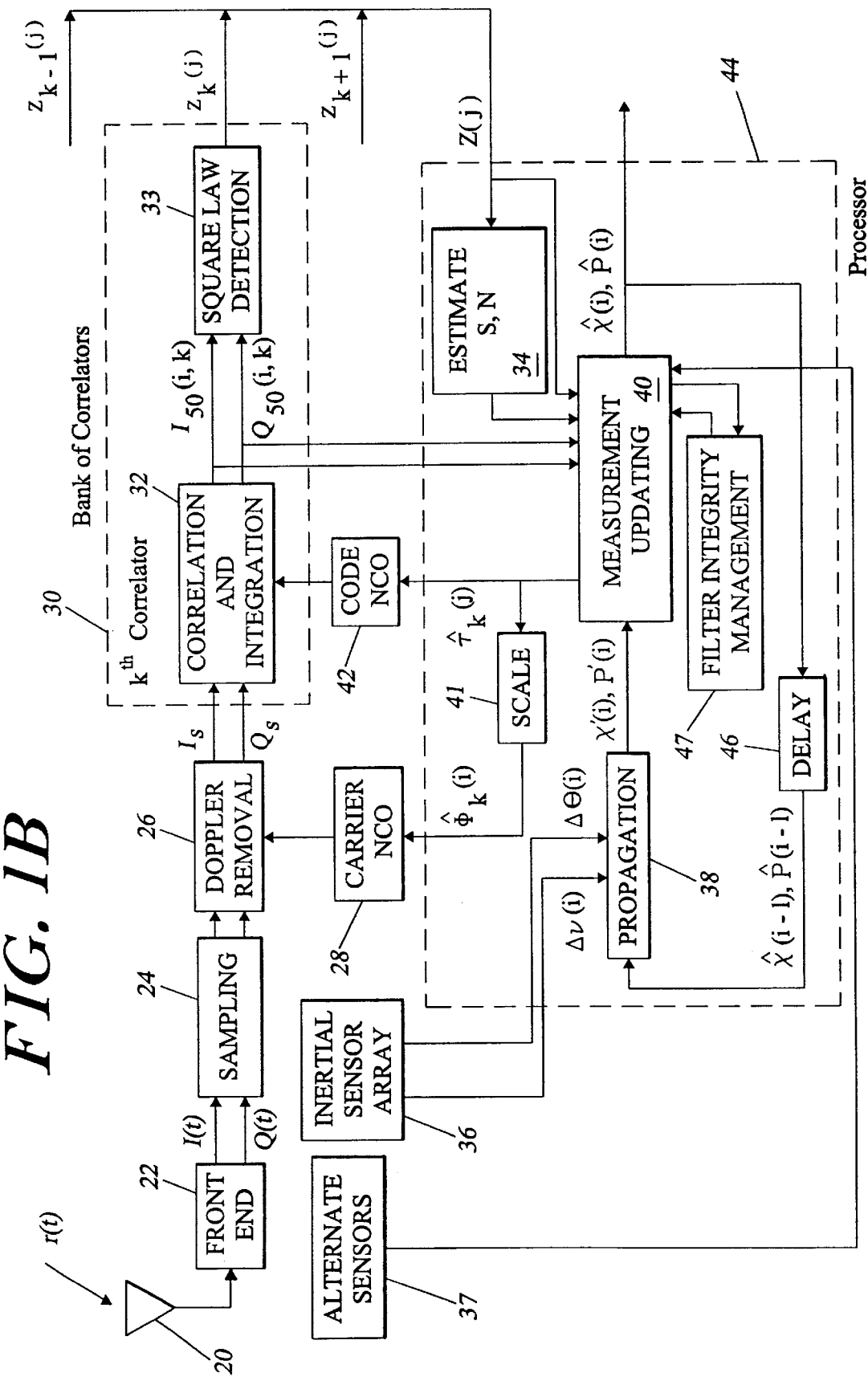
FIG. 1B is a schematic block diagram of the navigation system of FIG. 1A further employing INS data during propagation and alternative sensor data during measurement updating, in accordance with present invention.
Figure 9:
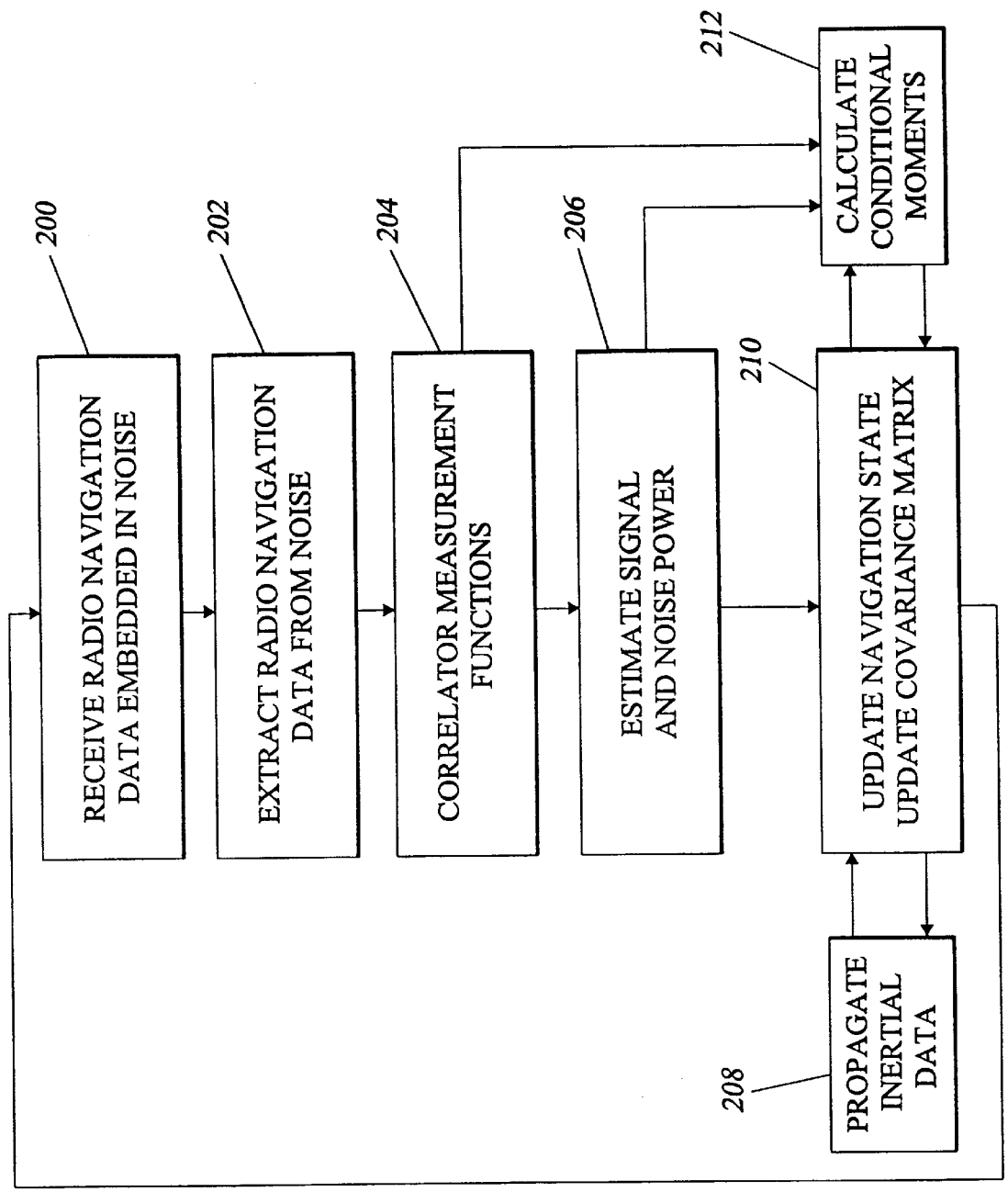
FIG. 9 is a flow diagram of code processing in accordance with the present invention.

FIG. 1A is a schematic block diagram of a navigation system employing In-phase and Quadrature correlator measurements to generate a multidimensional navigation solution, in accordance with the present invention. FIG. 1B is a block diagram of the system of FIG. 1A, further incorporating inertial sensor array measurements during data propagation and alternative sensor data during measurement updating, in accordance with the present invention. FIG. 9 is a flow diagram of the processing steps for determining the navigation solution, and will be referred to throughout the description of FIGS. 1A and 1B.

Referring to FIG. 1A, an RF signal r(t) is received by antenna 20, and may include multiple-satellite GPS signals corrupted by noise and interference (see step of FIG. 9). The GPS signals may comprise signals centered at $L_1$, (1575.42 MHz) and $L_2$ (1227.6 MHz) carrier frequencies or other frequencies such as $L_m$, which is being considered for future applications. The model for the received signal of interest r(t) from a single satellite at time t may be represented as:

$$r(t) = \sqrt{2S(t-\tau)} C(t-\tau) D(t-\tau) \cos(\omega_c t + \phi(t)) + J(t) \qquad (1)$$

where S(t) represents received signal power; $\tau$ represents time delay due to line-of-sight range and atmospheric propagation effects; C(t) represents a pseudo-random code, for example C/A or P(Y) codes; D(t) represents GPS "data bit" signals typically transmitted at a 50 Hz rate (rates up to 2 kilobits/sec are possible); $\omega_c$, represents a carrier frequency; $\phi(t)$ represents phase angle, which includes the effect of Doppler shift; and J(t) represents thermal background noise and interference.

The received signal r(t) is processed by front end electronics 22, which operate to remove energy outside the frequency band of interest. The front end 22 further demodulates the signal to a lower intermediate frequency at a rate which is more amenable to processing. The front end may include, for example, a bandpass filter.

The filtered signal is next processed to generate in-phase I(t) and quadrature Q(t) components of the received signal r(t). In a standard system, these components are 90° out-of-phase.

The components I(t), Q(t) are next digitized and converted to discrete form at sampler 24. As an example, the "integrate and dump" technique may be employed for this purpose. The resulting digitized and sampled in-phase and quadrature component signals are generated at a rate of, for example, 10 MHz.

The sampled signals are then processed to remove an estimated Doppler shift, using feedback signals from the carrier processing numerically-controlled oscillator (NCO) 28. The resulting signals $I_s$, $Q_s$ contain phase error and are generated at a rate of, for example, 10 MHz.

The discrete-time sampled in-phase and quadrature signals $I_s$, $Q_s$ are processed by a bank of correlators 30, which operate to extract information pertaining to the GPS signal transmission embedded in noise and interference (see step 202 of FIG. 9). The bank 30 may include a large number of correlators, for example 100. The correlations are carried out over a predetermined interval, for example 20 msec, synchronized with the 50 Hz data bit interval.

The outputs of the $k^{th}$ correlator at the $i^{th}$ time point are represented by:

$$I_{50}(i,k) = \delta t \sqrt{2S(i)} D(i) R_c(e_\tau(i) + k\Delta) \cos e_\theta(i) + \tilde{n}_I(i,k) \qquad (2a)$$

$$Q_{50}(i,k) = \delta t \sqrt{2S(i)} D(i) R_c(e_\tau(i) + k\Delta) \sin e_\theta(i) + \tilde{n}_Q(i,k) \qquad (2a)$$

where $I_{50}(i,k)$ and $Q_{50}(i,k)$ respectively represent the discrete-time 50 Hz in-phase and quadrature correlator output signals; $\delta t = 0.02$ seconds, corresponding to 50 Hz; $e_\tau$ represents the delay error in units of "chips"; $\Delta$ represents the spacing between correlators in the correlator bank in units of chips, as described below with reference to FIG. 3; k represents the correlator number, ranging from –m, ..., +m; $e_\theta$ represents the carrier phase error; and $R_c$ represents the correlation function:

$$R_c(x) = \frac{1}{p} \sum_{i=1}^{P} C(iT) C_{replica}(iT - x), \qquad (3)$$

where p represents the number of samples; C(iT) represents the received pseudo-random code after filtering; $C_{replica}(iT-x)$ represents the replica pseudo-random code delayed by x, generated within the receiver, and 1T is the chipping rate (10.23 MHz for P(Y) code, 1.023 MHz for C/A code). For P(Y)-code, p=204,600. The additive noises $\tilde{n}_I(j,k)$ and $\tilde{n}_q(j,k)$ represent the effects of thermal noise and interference. A data rate of 50 Hz is used here only for illustration; the invention is not limited to a 50 Hz data bit rate.

Figure 2:
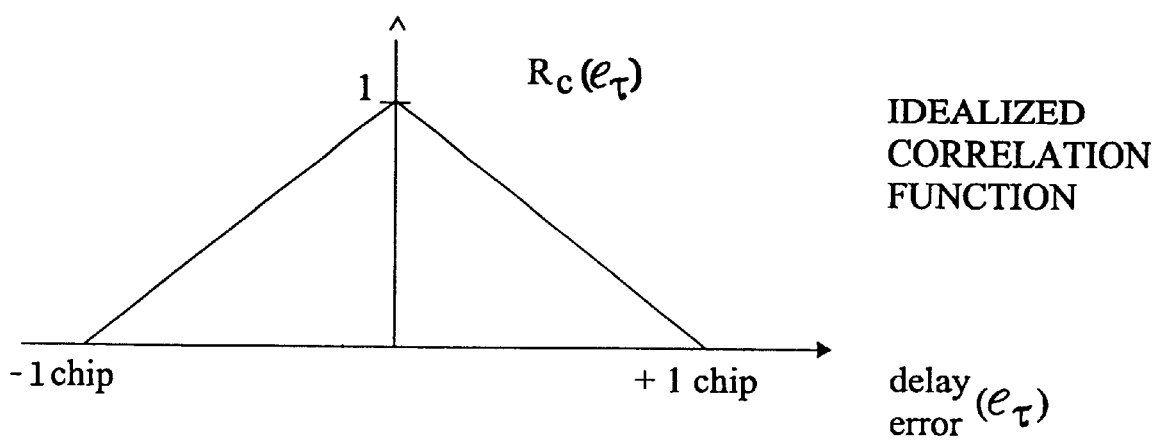
FIG. 2 is a plot of an idealized correlator function $R_c(e_\tau)$ as a function of delay error $e_\tau$, in units of chips, in accordance with the present invention.

FIG. 2 is a plot of the idealized correlator function $R_c(e_\tau)$ as a function of delay error $e_\tau$ in units of "chips". Chip length is approximately 30 meters for P(Y)-code and 300 meters for C/A-code. If the pseudo-random code of the input signal I(i), Q(i) correlates perfectly with the replica signal generated by the receiver, then $e_\tau = 0$ and the output $R_c = 1$. If the delay error is greater than +1 chip or less than –1 chip, then the output $R_c$ is 0. Between values of zero and ±1 chip delay, the correlator function $R_c$ ideally behaves linearly as shown in FIG. 2.

Extended Range Correlation

Conventional receivers typically employ three correlators per channel (early, prompt, late) with a spacing of one-half chip. An error signal is generated by differencing the outputs of the early and late correlators, generating a variable $\alpha(e_{los})$, which is a function of the navigation position error along the line of sight between the receiver and the current satellite $e_{los}$. If $|e_{los}| < \frac{1}{2}$ chip, then $\alpha$ a is ideally a linear function, providing a useable signal for closing a code tracking loop and for updating the navigation solution. If $|e_{los}| > \frac{1}{2}$ chip, then $\alpha$ is a nonlinear function causing the performance of conventional receivers to degrade, since linearity is assumed in such systems. If $|e_{los}| > \frac{3}{2}$ chip, then $\alpha = 0$.

In order to obtain useful measurements for large navigation errors, the present invention extends the number of correlators beyond three, thereby providing an "extended range correlator bank". The number of correlators employed in the extended range correlator bank is theoretically limitless; the outputs from each correlator are processed in an optimal manner and contribute to the navigation solution according to a weighting function dependent on current signal and noise power estimates, and a strong nonlinear dependence on the estimated rms line-of-sight position error calculated for each particular correlator. Calculation of the optimum weighting functions is central to the objective of obtaining minimum-variance estimates of the state vector and employs nonlinear estimation theory. Note that a bank of three correlators is equally applicable to the principles of the present invention.

In practice, the correlator bank range is selected to cover the maximum expected position navigation error during code tracking. For example, assume a maximum expected position error of 600 meters with C/A-code tracking and further assume a spacing of ½ chip between adjacent correlators. Since one C/A chip is equivalent to approximately 300 meters, a total of 9 correlators are needed to handle position errors of ±600 meters.

The maximum expected position error depends on several factors, including the maximum time interval that code lock is expected to be lost due to excessively high interference levels, and the precision of the inertial sensors that provide the navigation solution when code lock is lost. With proper design, the navigation position error magnitude will not exceed the range of the correlator bank and the navigation system will not lose track, in the sense that the estimated rms position navigation errors will track the actual errors with reasonable accuracy. Under these conditions, reacquisition of code tracking will be achieved relatively quickly when the interference level drops to a value that allows for resumption of code tracking.

Correlator Output Functions

In a non-coherent GPS code tracking system, as shown in FIG. 1A, the carrier phase error $e_\theta$ is of no interest. For this reason, the correlator output functions $I_{50}(i,k)$, $Q_{50}(i,k)$ are applied to a square law detection operation 33 to eliminate both the carrier phase error $e_\theta$ and the data bit $D(i)$, thus obviating the need for carrier lock.

The square law detector 33 operates to provide a sum of the squares of the correlator output functions $I_{50}(i,k)$, $Q_{50}(i,k)$ according to the relationship:

$$z(j, k) = \sum_{i=d(j-1)+1}^{dj} [I_{50}^2(i, k) + Q_{50}^2(i, k)], \quad (4)$$

where $z(j,k)$ represents the code measurement from the kth correlator at the jth sample time. The output $z(j,k)$ is the sum of d terms, for example if d=5, then $z(j,k)$ is a 10 Hz signal. The parameter d is used to set the code measurement data input rate to the processor 44. Other values are possible, depending on the application and processing rate. For the sake of clarity, in the description to follow, the time index "i" shall correspond to the output rate of the in-phase and quadrature correlator output functions $I_{50}(i,k)$, $Q_{50}(i,k)$, for example 50 Hz, and the time index "j" shall correspond to the code processing rate, for example 10 Hz.

With reference to step 204 of FIG. 9, the measurements $z(j,k)$ may be written in the form:

$$z(j,k)=2d\delta t^2 S(j) R_c^2(e_\tau(j)+k\Delta)+n(j,k) \quad (5)$$

where:

$$n(j,k)=v(j,k)+2\delta t\sqrt{2S(j)} R_c(e_\tau(j)+k\Delta)w(j,k) \quad (6)$$

is additive noise, and $$v(j, k) = \sum_{i=d(j-1)+1}^{dj} [\tilde{n}_i(i, k) + \tilde{n}_q(i, k)] \quad (7)$$

and $$w(j, k) = \sum_{i=d(j-1)+1}^{dj} D(i)[\tilde{n}_i(i, k)\cos e_\theta(i) + \tilde{n}_q(i, k)\sin e_\theta(i)] \quad (8)$$

If it is assumed that $\tilde{n}hd i(i,k)$ and $\tilde{n}_q(i,k)$ are independent zero-mean Gaussian white noise processes with variance $N(j)$ for i=d(j-1)+1, . . . , dj, then $v(i,k)$ has mean $2N(j)d$ and variance $4N^2(j)d$ and $w(j,k)$ has zero mean and variance $2N(j)d$. These statistical properties are used in a preferred embodiment of the present invention to estimate noise power, as described below.

FIGS. 2 and 3 are plots of a single central correlator function and of a plurality of idealized correlator functions $R_C$ in a correlator bank 30, respectively, as a function of delay error $e_\tau$ in units of chips. The correlator bank of FIG. 3 is designed to include a plurality of overlapping correlator functions, each spaced from adjacent correlators by $\Delta$ chips, the range of k correlators extending between -m, . . . , +m.

At each sample periodj, the code measurements $z(j,k)$ are calculated, and presented to the processor 44. Exemplary data for $z(j,k)$ are plotted in FIG. 4. As shown in FIG. 4, data points are plotted as a function of correlator number k. These data are generated at each sample period j for all k correlators. The data from successive code measurements are stored and used to calculate a noise bias level 50, as described below. The correlator measurement function given by Equation (5) is the key quantity used for code tracking, and is the input to the measurement updating function filter 40. The first term arises due to the signal, while the second term arises due to noise. The amount of signal present at the kth correlator depends on the delay error $e_\tau(j)$ and the delay associated with the kth correlator $k\Delta$. The signal component of the measurement is maximized if the delay error is equal to the delay assumed for the kth correlator. In this way, an implicit measurement of the delay error is obtained. Meaningful information is extracted from the set of measurements over all correlators based on estimates of signal power noise power and line-of-sight error variance. This is accomplished in the measurement updating filter 40.

II—Measurement Update

Minimum-Variance Estimation

The present invention is based on calculation of the true minimum variance estimate of the multidimensional navigation state vector x(t), given: (1) an estimate of the state vector at the initial time $t_0$, (2) an estimate of the error covariance matrix of the state vector estimation error at time $t_0$, and (3) the measurement history from an initial time $t_0$ to the current time t. The state vector x(t) is presumed to satisfy the continuous stochastic differential equation:

$$\dot{x}(t)=f(x,t)+\dot{q}(t) \quad (9)$$

where $f(x,t)$ is a known vector function and $\dot{q}(t)$ is a vector zero mean white Gaussian noise with known power spectral density matrix Q(t). Nonlinear measurements of the state x(t) are available, of the form:

$$z(t)=h(x,t)+\dot{r}(t) \quad (10)$$

where h(x,t) is a known function of x(t) and t, and $\dot{r}(t)$ is vector zero mean white Gaussian noise with known power spectral density matrix R(t). The measurements may be continuously or intermittently available.

Let p(x,t) represent the probability density of x(t) conditioned on the past measurement history and the initial conditions, and let $x_{est}(t)$ to be any estimate of x(t). Let $e(t)=x_{est}(t)-x(t)$ represent the estimation error at time t. Then the generalized variance $$E_w(t) = \int_x e(t)^T W(t) e(t) p(x,t) dx \tag{11}$$

is minimized, for any positive-definite weighting matrix W(t), by the estimate:

$$x_{est}(t) = \hat{x}(t) = \int_x x p(x,t) dx \tag{12}$$

where $\hat{x}(t)$ is both the conditional mean and the minimum variance estimate of x(t).

The objective is to calculate $\hat{x}(t)$ in real time or, in alternative scenarios, during post processing. It is preferable to calculate the conditional covariance matrix:

$$\hat{P}(t) = \int_x e(t)e(t)^T p(x,y) dx, \tag{13}$$

where $e(t)=\hat{x}(t)-x(t)$,
in real time, in order to appropriately specify the assumed underlying gaussian conditional probability density function.

The preferred embodiment of the present invention calculates approximations to Equations (12) and (13) in a digital processor, in either a real time or post-processing scenario, thereby achieving, as nearly as possible, the desired minimum variance estimator. The resulting estimator represents a significant departure from current tightly coupled systems and allows navigation system performance heretofore unobtainable at high interference levels.

It should be pointed out that the system architecture of the invention flows directly from the approximation of Equations (12) and (13) and is not based on any prior notions regarding the existence of tracking loops or distinct processing modules.

Processing Overview Returning to FIG. 1A, processor 44 receives the code measurements z(j,k) at a rate of 10 Hz, for example, and inertial sensor measurements from inertial sensor array 36 at a periodic rate, for example 100 Hz and, in response, generates, at measurement update function 40, an updated state vector $\hat{x}(i)$, representing, for example, a navigation solution (see step 210 of FIG. 9). As an example, the state vector $\hat{x}(i)$ may include information with regard to receiver position and velocity, receiver clock errors, atmosphere propagation delays, satellite errors, and the like. In a preferred embodiment, along with the state vector $\hat{x}(i)$, the measurement update function 40 of the processor 44 generates and maintain a covariance matrix of estimation errors $\hat{P}(i)$, which is required to estimate the quality of the navigation solution. The details of operation of the measurement update function are described in detail below.

The code measurements z(j,k) are further provided to an estimator 34 which serves to estimate the relative strength of the signal power S(j,k), noise bias $\hat{b}(j,k)$, and noise power N(j,k) therefrom (see step 212 of FIG. 9). The operation of the estimator is described in detail below. The estimates are provided to the measurement update function 40, to improve system accuracy.

Propagation

Propagation of the state estimate and error covariance matrix between measurements depends on the sensor suite. FIG. 1A corresponds to the case where only GPS data is available. Delay function 46 represents memory for temporary storage of the state vector $\hat{x}(i)$ and error covariance matrix $\hat{P}(i)$, and provides a delayed state vector $\hat{x}(i-1)$, as well as a delayed error covariance matrix $\hat{P}(i-1)$ to the propagation function 38. The propagation function 38 applies the dynamical model to the updated, delayed state vector $\hat{x}(i-1)$, and error covariance matrix $\hat{P}(i-1)$ to generate a "propagated" state vector x'(i), and propagated error covariance matrix P'(i) (see step 208 of FIG. 9). The propagated error covariance matrix P'(i) is required for calculating weighting functions used in the measurement update process. The propagated state vector x'(i) is computed as a function of the updated state vector $\hat{x}(i-1)$ using the dynamical model $f$ according to the following relationship:

$$\hat{x}(i)=\hat{x}(i-1)+f(\hat{x}(i-1), i-1)\delta t \tag{14a}$$

FIG. 1B shows the case where inertial sensors are employed. Inertial sensor data, provided by the inertial sensor array 36, includes recent inertial measurements; for example, the vector change in velocity of the platform $\Delta V(i)$, as well as the vector change in attitude angles $\Delta\theta(i)$. These data are generally measured in the body frame using strapdown gyroscopes and accelerometers; however, alternative configurations are applicable as well. The inertial data is applied to the delayed updated state vector $\hat{x}(i-1)$ according to the following relationship to provide a propagated state vector x'(i):

$$x'(i)=\hat{x}(i-1)+f(\hat{x}(i-1),\Delta V(i),\Delta\theta(i),i-1)\delta t \tag{14b}$$

where: x'(i) represents the propagated state vector; $\hat{x}(i-1)$ represents the delayed updated state vector; $f$ represents the dynamical model, an application of the laws of motion and the dynamical models for inertial sensor errors, clock errors, satellite errors, and atmospheric errors comprising all of the states; $\Delta V(i)$ represents the vector change in velocity in the interval [i-1, i] as measured by the inertial sensor array 36; $\Delta\theta(i)$ represents the vector change in attitude angle as measured by the inertial sensor array 36; and $\delta t$ represents the time interval between measurements. In this manner, a propagation of the state vector to the next measurement sample period j is achieved. Note that this relationship is an implementation of Equation (12) above.

In a similar manner, a propagation of the error covariance matrix $\hat{P}(i-1)$ is generated according to the following relationship:

$$P'(i)=\hat{P}(i-1)+[F(i)\hat{P}(i-1)+\hat{P}(i-1) F^T(i)+Q(i-1)]\delta t \tag{15}$$

where P'(i) represents the propagated error covariance matrix, $\hat{P}(i-1)$ represents the delayed updated error covariance error matrix, and F represents a matrix derived from the function $f$:

$$F(i) = \frac{\partial f}{\partial x}(x)\bigg|_{x=\hat{x}(i-1)} \tag{16a}$$

for the general (GPS only) case, and $$F(i) = \frac{\partial f}{\partial x}(x, \Delta v, \Delta \theta)\Big|_{\substack{x=\hat{x}(i-1)\\ \Delta v=\Delta v(i)\\ \Delta \theta=\Delta \theta(i)}} \quad (16b)$$

for the inertial data case, and $F^T$ represents the transpose of that matrix. Note that the relationship of Equation (15) is an implementation of Equation (13) above. Equations (14)–(16) hold if $\delta t$ is sufficiently small, which usually holds in practice. If $\delta t$ is not sufficiently small, then $\delta t$ can be divided into smaller subintervals and the propagation carried out sequentially over the subintervals.

Pertaining to the above relationship, the estimation error covariance matrices are defined as:

$$P(i)=\epsilon[e(i)e(i)^T]$$
$$P'(i)=\epsilon[e'(i)e'(i)^T] \quad (17)$$
$$e(i)=\hat{x}(i)-x(i)$$
$$e'(i)=x'(i)-x(i) \quad (18)$$

where $e(i)$ represents the state estimation error vector just after measurement updating, and $e'(i)$ represents the state estimation error vector just prior to measurement updating.

Code Processing—Measurement Update of State Vector

Figure 6:
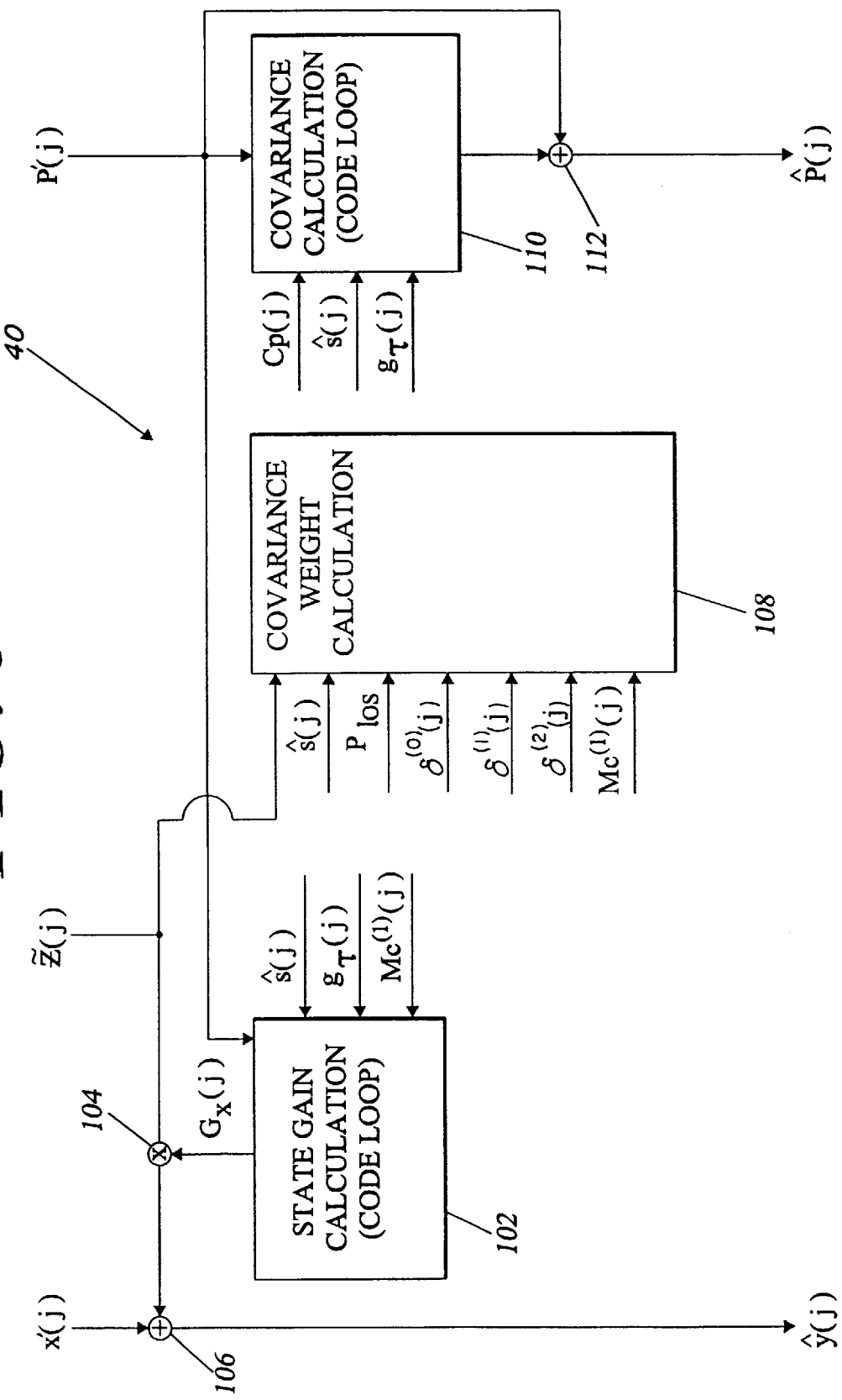
FIG. 6 is a block diagram of the code processing measurement update function, in accordance with the present invention.

Returning to FIGS. 1A and 1B, and with further reference throughout this portion of the discussion to the block diagram of FIG. 6, the propagated state vector $x'(i)$ and propagated error covariance matrix $P'(i)$ are applied to the measurement updating function 40, which serves to generate an updated state vector $\hat{x}(i)$, and an updated error covariance matrix $\hat{P}(i)$, based on the propagated state vector $x'(i)$, the propagated error covariance matrix $P'(i)$, estimated values for signal S and noise N from the estimator function 34, and the code measurements $z(j,k)$. Along with the updated state vector $\hat{x}(i)$, and the updated error covariance matrix $\hat{P}(i)$, the measurement updating function further calculates the estimated delay for the code tracking processing $\hat{\tau}_k(j)$, and the estimated phase $\hat{\phi}_k(i)$, for the carrier tracking processing.

The code measurement update equation for the state vector $\hat{x}(j)$ as depicted by state gain calculation portion 102, multiplier 104, and adder 106 of FIG. 6 is represented as:

$$\hat{x}(j)=x'(j)+G_x(j)\tilde{Z}(j) \quad (19)$$

where $x'(j)$ represents the propagated state vector, $G_x(j)$ represents the state gain defined below in Equation (21), and $\tilde{Z}(j)$ represents a code measurement vector compensated for estimated bias; $\tilde{Z}(j)=Z(j)-\hat{b}(j)1$; where $\hat{b}(j)$ is the estimated bias and where 1 is expressed in Equation (50) below, and where $$Z(j) = \begin{bmatrix} z(j,-m) \\ z(j,-m+1) \\ \vdots \\ z(j,m-1) \\ z(j,m) \end{bmatrix}_{2m+1} \quad (20)$$

Note that the relationship of Equation (19) is an implementation of Equation (12) above.

Figure 5:
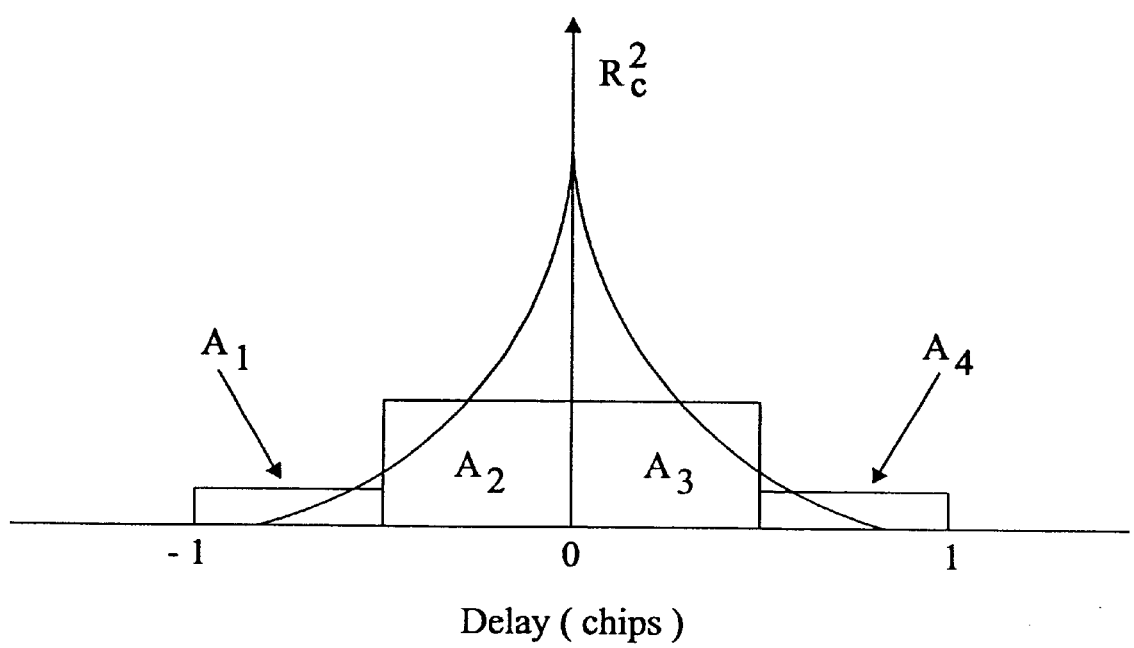
FIG. 5 is an example of a four segment piecewise constant approximation for $R_c^2$, in accordance with the present invention.

The state gain function $G_x(j)$, as calculated in the state gain calculation block 102 of FIG. 6, is represented by the relationship:

$$G_x(j)=\beta(j)u(j)\gamma^{(1)}(j)^T \quad (21)$$

where $\beta(j)=2\hat{S}(j)\delta t$, $\hat{S}(j)$ is the estimated value of $S(j)$ as expressed below in Equation (51), and where $\gamma^{(1)}(j)$ is represented by:

$$\gamma^{(s)}(j) = \begin{bmatrix} M_{c,-m}^{(s)}(j)/\hat{N}_{-m}(j) \\ \vdots \\ M_{c,+m}^{(s)}(j)/\hat{N}_{+m}(j) \end{bmatrix} \quad s=0,1,2 \quad (22)$$

where $S=1$, and where $\hat{N}_k(j)$ is the kth diagonal of the estimated diagonal measurement noise covariance matrix:

$$\hat{N}(j) = \begin{bmatrix} \hat{N}_{-m}(j) & 0 & \cdots & 0 \\ 0 & \hat{N}_{-m+1}(j) & \cdots & 0 \\ \vdots & \vdots & \ddots & 0 \\ 0 & 0 & 0 & \hat{N}_m(j) \end{bmatrix} \quad (23)$$

and where $M_c^{(1)}(j)$ represents the vector:

$$M_c^{(s)}(j) = \begin{bmatrix} M_{c,-m}^{(s)}(j) \\ \vdots \\ M_{c,+m}^{(s)}(j) \end{bmatrix} \text{ with } s=1, \quad (24)$$

whose elements are the second of three correlator moments $M_c^{(s)}(j)$; s=0, 1, 2:

$$M_{c,k}^{(s)}(j) = \sum_{r=1}^{n_{seg}} (\alpha_r(k))^s A_r p_\alpha(\alpha_r(k), P_{los}(j))(chips)^s \quad (25)$$

$$s = 0, 1, 2;$$

$$\alpha_r(k) = k\Delta - 1 + \frac{2r-1}{n_{seg}} chips \quad k=-m, \ldots, +m.$$

where k represents the correlator index $\{-m \ldots +m\}$; $\Delta$ is the correlator spacing in units of chips; $n_{seg}$ is the number of approximation segments in the correlation curve as shown in FIG. 5; $P_{los}(j)$ represents the variance of the line-of-sight error at the jth time point:

$$P_{los}(j)=g_\tau(j)^T P'(j) g_\tau(j) \quad (26)$$

where $g_\tau$ is a vector determined based on the state definition and geometry such that:

$$e_{los}(j)=g_\tau(j)^T e'(j) \quad (27)$$

is satisfied, where $e'(j)$ is defined above in Equation (18). For example if the state vector $\hat{x}(j)$ is represented by:

$$\hat{x}(j) = \begin{bmatrix} r \\ v \\ \theta \\ \text{clock bias} \end{bmatrix} = \begin{bmatrix} \text{position} \\ \text{velocity} \\ \text{attitude angle} \\ \text{clock bias} \end{bmatrix} \quad (28)$$

then:

$$g_\tau(j) = [-u_{sat}^T \quad 0_{1\times 3} \quad 0_{1\times 3} \quad 1] \tag{29}$$

where the unit vector $u_{sat}$ from the navigation platform toward the satellite is:

$$u_{sat} = \frac{\hat{r}_{sat} - r'}{\|\hat{r}_{sat} - r'\|} \tag{30}$$

and where $\hat{r}_{sat}$ is the satellite position, and r' is the estimated navigation platform position, both in the navigation coordinate frame.

Returning to Equation (25), $p_\alpha$ represents the Gaussian density function:

$$p_\alpha(\alpha_r, P_{los}(j)) = \frac{e^{-\frac{1}{2}\frac{\alpha_r^2}{P_{los}(j)}}}{\sqrt{2\pi P_{los}(j)}} \tag{31}$$

and $A_r$ is the area under the ith rectangle of FIG. 5. The area of a rectangle is approximately equal to the area under the curve over the rectangle boundary. It has been found that ten rectangles suffice when the rms line-of-sight error exceeds approximately 0.1 chip; for smaller line-of-sight errors, a finer approximation should be used. Using the idealized approximation:

$$R_c(\tau) = 1 - |\tau|; \quad |\tau| \leq 1 \tag{32}$$

with $\tau$ in units of chips, the segment areas are:

$$A_r = \begin{cases} \left(\frac{2}{n_{seg}}\right)^3 [r(r-1)]; & r = 1, 2, \ldots, \frac{n_{seg}}{2} \\ A_{n_{seg}-j+1}; & r = \frac{n_{seg}}{2} + 1, \ldots, n_{seg} \end{cases} \tag{33}$$

where $n_{seg}$ is the total number of segments in the approximation.

As an alternative to the expression of Equation (25), the correlator moments can be determined in the following manner. This approach works well for any amount of rms error, but computations are more complex. For the $k^{th}$ correlator (k=−m, . . . , m), the zeroth, first, and second moments $M_{c,k}^{(s)}(j)$; s=0, 1, 2 can be represented by:

$$M_{c,k}^{(0)}(j) = [(k\Delta - 1)^2 + P_{los}(j)]I_1^{(0)}(k, j) + \tag{34}$$
$$[(k\Delta + 1)^2 + P_{los}(j)]I_2^{(0)}(k, j) +$$
$$\sqrt{\frac{P_{los}(j)}{2\pi}} [-(k\Delta - 1)e_a(k, l) -$$
$$4e_b(k, j) + (k\Delta + 1)e_c(k, j)],$$

$$M_{c,k}^{(1)}(j) = -2P_{los}(j)[(k\Delta - 1)I_1^{(0)}(k, j) + (k\Delta + 1)I_2^{(0)}(k, j)] + \tag{35}$$
$$2\sqrt{\frac{P_{los}(j)}{2\pi}} P_{los}(j)[e_a(k, j) - e_c(k, j)],$$

and $$M_{c,k}^{(2)}(j) = [(k\Delta - 1)^2 P_{los}(j) + 3P_{los}^2(j)]I_1^{(0)}(k, j) + \tag{36}$$
$$[(k\Delta + 1)^2 P_{los}(j) + 3P_{los}^2(j)]I_2^{(0)}(k, j) +$$
$$\sqrt{\frac{P_{los}(j)}{2\pi}} P_{los}(j)[-(k\Delta - 1)e_a(k, j) -$$
$$8e_b(k, j) + (k\Delta + 1)e_c(k, j)]$$

where (37)

$$I_1^{(0)}(k, j) = \frac{1}{2}[\text{sign}(b(k, j))\text{erf}(|b(k, j)|) - \text{sign}(b(k, j))\text{erf}(|a(k, j)|)]$$

$$I_2^{(0)}(k, j) = \frac{1}{2}[\text{sign}(c(k, j))\text{erf}(|c(k, j)|) - \text{sign}(b(k, j))\text{erf}(|b(k, j)|)] \tag{38}$$

and where $e_a(k, j) = \exp[-a^2(k, j)]$,
$e_b(k, j) = \exp[-b^2(k, j)]$,
$e_c(k, j) = \exp[-c^2(k, j)]$, $$a(k, j) = \frac{(k\Delta - 1)}{\sqrt{2P_{los}(j)}},$$

$$b(k, j) = \frac{(k\Delta)}{\sqrt{2P_{los}(j)}},$$

$$c(k, j) = \frac{(k\Delta + 1)}{\sqrt{2P_{los}(j)}},$$

and where erf is the standard error function:

$$\text{erf}(x) = \frac{2}{\sqrt{\pi}} \int_0^x e^{-x^2} dx \tag{39}$$

commonly available in mathematical software libraries.

Returning to the state gain function of Equation (21), u (j) is a vector representing:

$$u(j) = \frac{P'(j)g_\tau(j)}{P_{los}(j)} \tag{40}$$

where P'(j) is the propagated error covariance matrix, $g_\tau(j)$ is defined above in Equation (27), and $P_{los}(j)$ is defined above in Equation (26).

Code Processing—Measurement Update of Error Covariance Matrix

The update equation for the error covariance matrix is calculated by the covariance weight calculation block 108, covariance calculation block 110, and adder 112 of FIG. 6 represented by:

$$\hat{P}(j) = P'(j) + \beta(j)u(j)u(j)^T C_P(j) \tag{41}$$

where the covariance weights are calculated in block 108 of FIG. 6 according to the relationship:

$$C_P(j) = [[\gamma^{(2)}(j) - P_{los}(j)\gamma^{(0)}(j)]^T dv(j) - \beta(j)\gamma^{(1)T}(j)M_c^{(1)}(j)\Delta t] \tag{42}$$

where:

$$dv(j) = \tilde{Z}(j) - \beta(j)M_c^{(0)}(j)\Delta t \tag{43}$$

where $\gamma^{(s)}(j)$; s=0, 1, 2 is defined above in Equation (22); and where P'(i) is the propagated error covariance matrix described above, $\Delta t = d\delta t$, and $M_c^{(s)}(j)$ is given by Equation (24), above. Note that the relationship of Equation (41) is an implementation of Equation (13) above.

The parameter for estimated delay for code tracking processing $\hat{\tau}_k(j)$, provided to the code NCO 42, is generated in the measurement update function according to the relationship:

$$\hat{\tau}_k(j) = \|\hat{r}_{sat} - \hat{r}\| + \hat{b}_{clk} \text{ chips} \tag{44}$$

where $\hat{b}_{clk}$ is an estimate of the clock bias, which is a component of the state vector $\hat{x}(i)$. The estimated delay parameter $\hat{\tau}_k(j)$ is provided to the code processing NCO in an attempt to line up the replica code with the received code.

Code Processing—Signal and Noise Estimation

Figure 8:
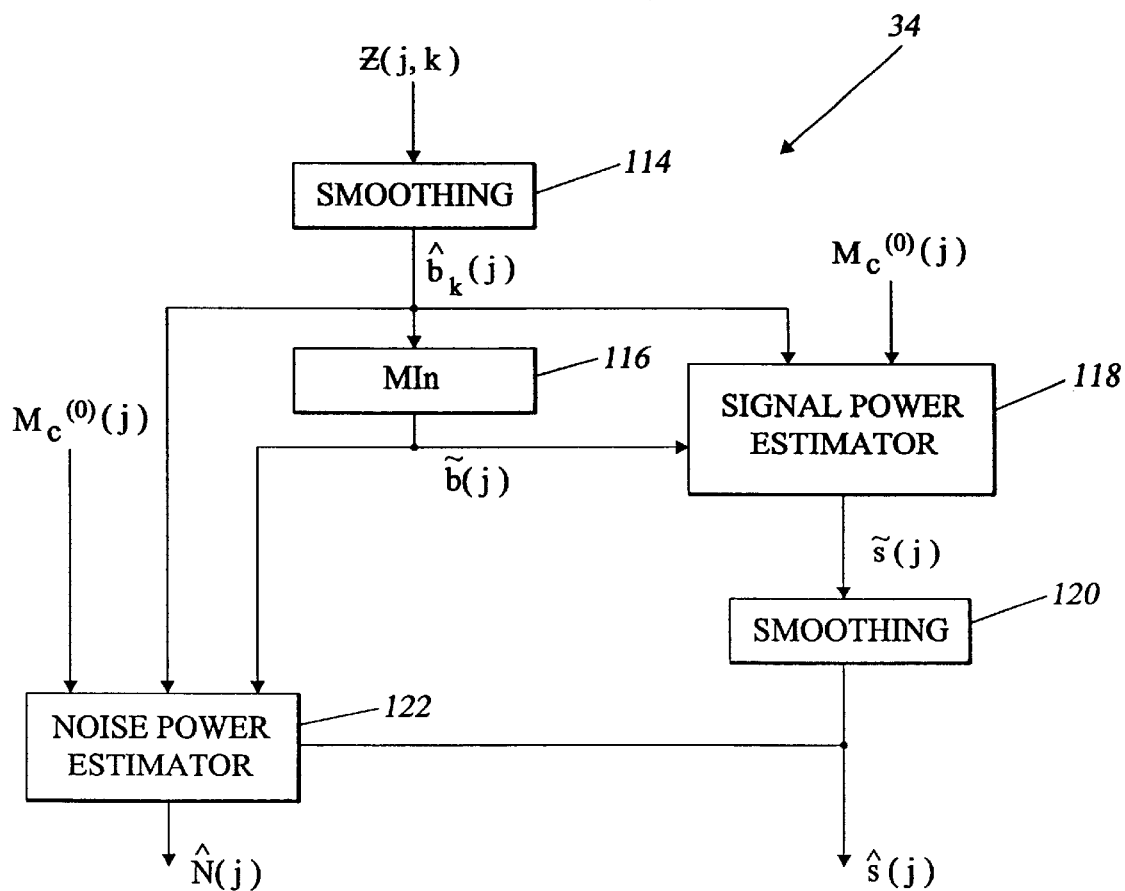
FIG. 8 is a block diagram of the code processing noise power and signal power estimation function, in accordance with the present invention.

Returning to FIGS. 1A and 1B, and with reference throughout the following discussion to FIG. 8, the estimator 34 is responsible for estimating noise bias $\hat{b}(j,k)$, signal power $\hat{S}(j,k)$, and noise power $\hat{N}(j,k)$, based on the code measurement data $Z(j,k)$.

With regard to the noise bias estimation $\hat{b}(j,k)$, it is assumed that the noise at all correlators is statistically the same. However, some of the correlator measurements include signal power in addition to the noise. The bias estimate can be calculated according to the following steps.

First, the bias estimate on each correlator is updated using a smoothing equation at block 114 of FIG. 8:

$$\hat{b}_k(j) = \alpha \hat{b}_k(j-1) + (1-\alpha) z(j,k) \quad k = -m, \ldots, m \tag{45}$$

where:

$$\alpha = e^{-\Delta t / \tau_b} \tag{46}$$

where $\tau_b$ is the smoothing time constant, for example 1 sec. The bias is present on all correlators, and is of positive sign. Signal power is present only on a few of the correlators, also with a positive sign. The bias is thus estimated at block 116 as:

$$\tilde{b}(j) = \min_k \{\hat{b}_k(j)\} \tag{47}$$

Signal power is estimated at function 118 as follows. The least squares estimate:

$$\tilde{S}(j) = \frac{M_c^{(0)}(j)^T [\hat{b}(j) - \tilde{b}(j)\mathbf{1}]}{2\Delta t \delta t M_c^{(0)}(j)^T M_c^{(0)}(j)} \tag{48}$$

is calculated, where $$\hat{b}(j) = \begin{bmatrix} \hat{b}_{-m}(j) \\ \vdots \\ \hat{b}_{+m}(j) \end{bmatrix}_{2m+1} \tag{49}$$

and where:

$$\mathbf{1} = \begin{bmatrix} 1 \\ 1 \\ \vdots \\ 1 \end{bmatrix}_{2m+1} \tag{50}$$

This estimate is then smoothed at function 120 to filter out noise, using a smoothing equation:

$$\hat{S}(j) = \alpha \hat{S}(j-1) + (1-\alpha) \tilde{S}(j) \tag{51}$$

where the smoothing parameter a is defined above in Equation (46).

The noise power vector estimate:

$$\hat{N}(j) = \begin{bmatrix} \hat{N}_{-m}(j) \\ \vdots \\ \hat{N}_{+m}(j) \end{bmatrix}_{2m+1} \tag{52}$$

is calculated at block 122 according to the relationship:

$$\hat{N}(j) = 4\delta t^2 \hat{S}(j) \hat{b}(j) M_c^{(0)}(j) + \frac{\tilde{b}(j)^2}{d} \mathbf{1} \tag{53}$$

This technique fully accounts for the fact that there is a certain amount of signal in some correlators and none in others, in other words, the $R_c$ term in Equation (6) approaches zero for errors outside the correlator range.

Carrier Processing—Measurement Update of State Vector and Covariance Matrix

Carrier tracking is performed using the 50 Hz quadrature signals $Q_{50}(i,k)$ as given above in Equation (2b). The state vector is preferably updated by gain calculation block 124, multiplier 126, and adder 128 of FIG. 7, using the outputs from only the prompt correlator (k=0). Only the prompt correlator output is needed for carrier processing because, due to the small wavelength of the carrier signal, only small error readings are discernable; for example, $L_1$ carrier wavelength is 19 cm, well within the C/A code chip length of 300 m, and errors larger than this lead to carrier phase ambiguities. The state vector is updated using:

$$\hat{x}(i) = x'(i) + G_y(i) Q_{50}(i,0) \tag{54}$$

The gain matrix $G_y(i)$ as calculated in block 124 is represented by:

$$G_y(i) = \frac{P'(i) H(i)^T}{\rho(i) H(i)^T P'(i) H(i) + \hat{N}_{carr}(i)} \tag{55}$$

where $H(i)$ is the measurement vector:

$$H(i) = -\delta t \sqrt{2\hat{S}(i)} \, \hat{D}(i) e^{-\frac{\sigma_\theta'(i)^2}{2}} g_\theta(i)^T \tag{56}$$

where $\hat{D}(i)$ is the data bit estimate (see Equation (63) below), and where:

$$g_\theta(i) = \frac{2\pi f_{carr}}{f_{code}} g_\tau(i) \tag{57}$$

and where $f_{carr}$ is the carrier frequency, $f_{code}$ is the pseudorandom code chipping rate, $g_\tau(i)$ is given above by Equation (27); and $$\rho(i) = \frac{\sinh(\sigma_\theta'(i)^2)}{\sigma_\theta'(i)^2}. \tag{58}$$

where $\sigma_\theta'(i)^2$ is the estimated phase error variance along the line-of-sight:

$$\sigma'_\theta(i)^2 = \left(\frac{2\pi f_{carr}}{f_{code}}\right)^2 P_{los}(i) \qquad (59)$$

From the above, it can be determined that as the filter's estimate of RMS phase error along the line-of-sight becomes small, for example on the order of 0.1 radians, the parameter $\exp(\sigma_\theta'(i)^2)/2$ from Equation (56) approaches one, as does the parameter $\rho(i)$ of Equation (58). It therefore follows, that as the limit of signal SNR increases and RMS phase error decreases, the operation of these functions approach the operation of the Kalman filter, well-suited for operation in the high-SNR regime.

However, a filter characterized by the above equations would also demonstrate an advantageous decrease in measurement gain as RMS phase error increases. This results in a corresponding advantageous mitigation of the problem of phase ambiguity present in traditional receivers. The measurements characterized by Equations (2a) and (2b) above depend on $\cos(e_\theta)$ and $\sin(e_\theta)$, and therefore contain no information relevant to the non-linear phenomenon of "cycle slipping". This ambiguity presents a serious problem in contemporary receivers.

One way to mitigate this problem is to compare resolutions from multiple satellites, and using the geometric considerations of intersecting spheres, an estimate of the degree of cycle slipping can be determined. However this technique is complicated and time consuming, and therefore expensive.

The present invention addresses this problem by incorporating a filter which approaches the behavior of a linear Kalman filter as the SNR becomes large, but operates as a non-linear filter for low values of SNR, allowing for a non-linear characterization of the non-linear cycle slipping problem. In this manner, the present invention takes into account, statistically, the cycle slipping problem.

Figure 7:
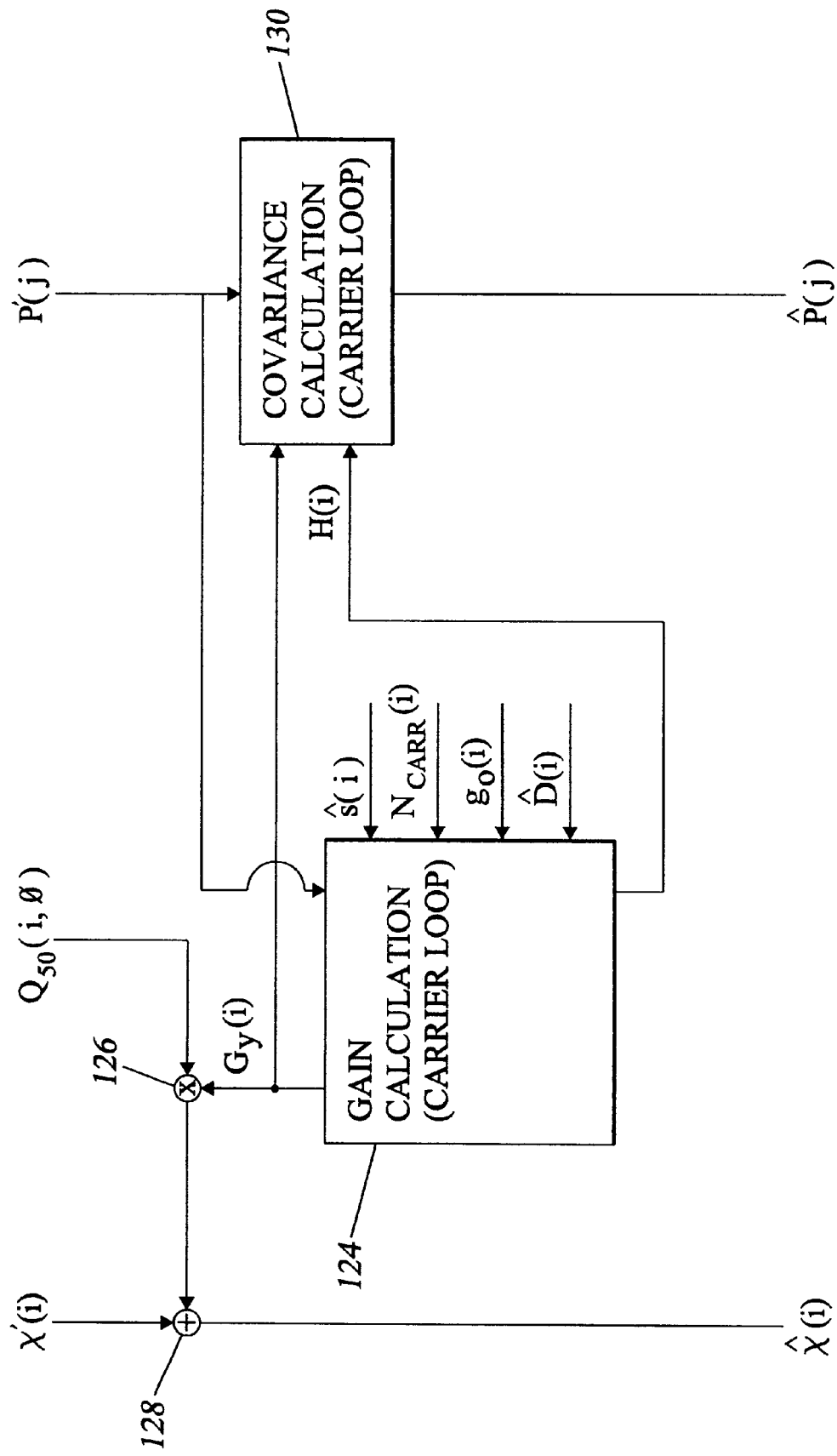
FIG. 7 is a block diagram of the carrier processing measurement update function, in accordance with the present invention.

The covariance matrix estimate is updated at block 130 of FIG. 7 using the relationship:

$$\hat{P}(i)=[I-G_y(i)H(i)]P'(i). \qquad (60)$$

where $G_y(i)$ and $H(i)$ are shown above in Equations (55) and (56), respectively.

Carrier Processing—Noise Power Estimate

The carrier noise power estimate $\hat{N}_{carr}$ is calculated under the assumption that the correlator bank is broad enough such that only noise appears at the two end correlators. With this assumption, the instantaneous noise variance estimate is:

$$V(j)=\tfrac{1}{4}[I_{50}(i,-m)^2+Q_{50}(i,-m)^2+I_{50}(i,m)^2+Q_{50}(i,m)^2] \qquad (61)$$

The noise estimate used in the filter is obtained through smoothing:

$$\hat{N}_{carr}(i)=\alpha\hat{N}_{carr}(i)+(1-\alpha)V(j) \qquad (62)$$

Carrier Processing—Data Bit Estimate

The data bit $D(i)$ comprises a 50 Hz signal used to identify the satellite source and satellite ephemeris. Using Equation (2a), assuming that the phase error $e_\theta(i)$ and the noise are sufficiently small, then in a preferred embodiment, the data bit is calculated as:

$$\hat{D}(i)=\mathrm{sign}(I_{50}(i,0)) \qquad (63)$$

Other, more sophisticated, techniques known to those skilled in the art may also be applied for determining the data bit.

Carrier Processing—Estimated Phase Determination

The parameter for estimated phase for carrier tracking processing $\hat{\phi}_k(i)$, provided to the carrier NCO 28, is generated by the scale processor 41 according to the relationship:

$$\hat{\phi}_k(j) = \hat{\tau}_k(i)\left[\frac{2\pi f_{carr}}{f_{code}}\right] \text{ radians} \qquad (64)$$

where $\hat{\tau}_k(i)$ is shown above in Equation (44). The estimated phase parameter $\hat{\phi}_k(i)$ is provided to the carrier NCO 28 in an attempt to line up the estimated phase with the true phase.

III—Filter Integrity Management

The existence of unmodeled interference, whether intentional or unintentional, in the low-power GPS signal, can cause performance degradation during actual operation. Furthermore, the filter processes are a discrete-time approximation to the exact continuous-time non-linear filtering equations; as a consequence, time quantization effects are introduced which can lead to non-positive-definiteness of the estimated covariance matrix. In order to preserve the integrity of the navigation solutions under a wide variety of operational scenarios, including unmodeled noise bursts, and under the constraints of discrete-time processing, several modifications of the processes are preferred via a filter integrity management unit 47 (see FIGS. 1A and 1B) in the form of a subprocess that monitors and manages various behavioral aspects of the measurement update unit 40.

With regard to signal power estimation, the denominator of Equation (48) is changed to $2\Delta t\delta t$. In its original form, the denominator can become too small at very large values of estimated line-of-sight variance $P_{los}(j)$ resulting in weights $G_x(j)$ that are too large in magnitude.

To preserve the integrity of the error covariance matrix P, the parameter $C_P(j)$, defined in Equation (42) is used to determine the form of correction. If $C_P(j)>0$ then $\hat{P}(j)>P'(i)$, and the effect of measurement incorporation is to make the estimated error covariance matrix more positive-definite. From physical arguments, an upper bound may be placed on the relative increase in P which conforms with reality. In view of this, the covariance update Equation (15) is changed to $$\hat{P}(j)=P'(j)+f_R(j)u(j)u(j)^T C_P(j) \qquad (65)$$

where $$f_R(j) = \begin{cases} 1; & dP_{\max} \le dP_{limit} \\ \dfrac{dP_{limit}}{dP_{\max}}; & dP_{\max} > dP_{limit} \end{cases} \qquad (66)$$

and $$dP_{\max} = \max_i\left(\left|\frac{\hat{P}_{ii}(j)}{P'_{ii}(j)} - 1\right|\right) \qquad (67)$$

and the parameter $dP_{limit}$ is set depending on the application; for example, a typical value for $dP_{limit}$ is 0.1.

If $C_P(j)<0$, then the effect of the measurement incorporation is to make the estimated error covariance matrix less positive definite. In this case, it is necessary to insure that $\hat{P}(j)$ remain positive semi-definite after measurement updating. This is accomplished by setting:

$$f_R(j) = \frac{\tilde{R}}{P_{los}(j) + \tilde{R}} \qquad (68)$$

and $$\tilde{R} = -\frac{P_{los}(j)^2}{\beta(j)C_P(j)} \qquad (69)$$

In the case where the estimated covariance matrix is modified from its nominal value, as described above, then the gain matrix $G_x(j)$ is likewise modified by changing the process of Equation (21) to:

$$G_x(j) = -f_R(j)\beta(j)u(j)\gamma^{(1)}(j)^T \qquad (70)$$

Physical considerations place an upper limit on the magnitude of the change in estimated position which conforms to reality during measurement updating. The estimated change in the three position components of the state vector estimate at measurement updating are calculated as follows. From Equation (19), the change in estimated position at a measurement is:

$$d\hat{r}(j) = [G_x(j)\tilde{Z}(j)]i_r \qquad (71)$$

where $i_r$ is the 3×1 position index. The updated position vector is then calculated as:

$$\hat{r}(j) = r'(j) + f_r(j)d\hat{r}(j) \qquad (72)$$

where:

$$f_r(j) = \begin{cases} 1; & dr_{max} \le dr_{limit} \\ \dfrac{dr_{limit}}{dr_{max}}; & dr_{max} > dr_{limit} \end{cases} \qquad (73)$$

and $$dr_{max} = \max_i (|d\hat{r}_{i_r(i)}|) \qquad (74)$$

The parameter $dr_{limit}$ is set according to the application; for example, a typical value for $dr_{limit}$ may be 0.1 chips for code processing.

While this invention has been particularly shown and described with references to preferred embodiments thereof, it will be understood by those skilled in the art that various changes in form and details may be made therein without departing from the spirit and scope of the invention as defined by the appended claims.

For example, note that the above calculations can be performed both on a vector or matrix basis. The principles of the invention apply equally well to both approaches. Additionally, the present invention may be implemented on any of a number of hardware/software configurations, for example on a digital microprocessor, specialized digital signal processors, programmable gate arrays, custom application specific integrated circuits (ASICs), or other suitable means.

Note that although for purposes of discussion, 50 Hz is used as a processing rate for carrier processing, and 10 Hz is used for code processing, other rates are equally applicable to the present invention. Note further that although $L_1$ and $L_2$ broadcast frequencies are given as examples above, the present invention is equally applicable to future broadcast frequencies, for example $L_m$. Additionally, although ½ chip spacing is used above in the example of FIG. 3, the invention further pertains to arbitrary correlator spacing.

We claim:

1. A system for determining a multidimensional navigation state for a navigation platform based on radio navigation data transmitted by external terminals comprising:
    a radio navigation data receiver for receiving and amplifying said radio navigation data embedded in noise;
    an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal;
    an estimator for estimating the radio navigation data signal power and noise power from the correlator output functions; and
    a measurement update unit including a nonlinear filter, said measurement update unit for updating the navigation state based on a calculation of the conditional moments of the navigation state using a set of correlator moments, the calculation being based on the estimated radio navigation data signal power and noise power and the correlator output functions;
        wherein said correlator moments are calculated with said nonlinear filter and represent statistical expectations of nonlinear functions of the line-of-sight position errors.

2. The system of claim 1 wherein the radio navigation data comprises Global Positioning System (GPS) data, and wherein the radio navigation data receiver comprises a GPS receiver.

3. The system of claim 1 further comprising a propagator for applying a dynamical model to the navigation state to generate a propagated navigation state for processing by said measurement update unit.

4. The system of claim 3 further comprising an inertial sensor unit for generating inertial data indicative of the inertial behavior of the platform, the inertial data being applied to the dynamical model.

5. The system of claim 1 wherein auxiliary sensor data is provided to the measurement update unit for updating the navigation state.

6. The system of claim 5 wherein the auxiliary data is selected from the group of data types consisting of inertial data, altimeter data, radar data, and electro-optical device data.

7. The system of claim 1 wherein the multidimensional navigation state includes information selected from the group consisting of position, velocity, attitude, receiver clock errors, inertial sensor errors, propagation delays, and satellite errors.

8. The system of claim 1 wherein the conditional moments are calculated to include measurement non-linearities in the correlator output functions.

9. The system of claim 1 wherein the measurement update unit further generates an estimated time delay, which is used to minimize the number of correlators.

10. The system of claim 1 wherein the measurement update unit further generates an estimated phase, used to improve performance in said system.

11. The system of claim 1 wherein the estimator comprises
    a signal power estimator for determining radio navigation data signal power based on correlator moments; and
    a noise power estimator for estimating noise power based on the correlator moments and said signal power estimate.

12. A system for determining a multidimensional navigation state for a navigation platform based on radio navigation data transmitted by external terminals comprising:
- a radio navigation data receiver for receiving and amplifying said radio navigation data embedded in noise;
- a bank of correlators for extracting said radio navigation data from said noise over a range of delay error, said correlators processing said radio navigation data and said noise to generate correlator output functions indicative of degree of correlation for each correlator between said radio navigation data and a known internal replica signal;
- an estimator for estimating the radio navigation data signal power and noise power from the correlator output functions; and
- a measurement update unit including a nonlinear filter, said measurement update unit for updating the navigation state based on conditional moments of the navigation state calculated as a function of the estimated radio navigation data signal power and noise power, and the correlator outputs.

13. The system of claim 12 further comprising an inertial sensor unit for generating inertial data indicative of the inertial behavior of the platform and wherein the conditional moments of the navigation state are further calculated as a function of the inertial data.

14. The system of claim 12 wherein the radio navigation data comprises Global Positioning System (GPS) data, and wherein the radio navigation data receiver comprises a GPS receiver.

15. The system of claim 12 further comprising a propagator for applying sensed inertial data to a dynamic model based on a recently updated navigation state to generate updated inertial data provided to said measurement update unit.

16. The system of claim 12 wherein the multidimensional navigation state includes information selected from the group consisting of position, velocity, attitude, receiver clock errors, inertial sensor errors, propagation delays, and satellite errors.

17. The system of claim 12 wherein the conditional moments are calculated using a set of correlator moments which are calculated with said nonlinear filter and which represent statistical expectations of nonlinear functions of line-of-sight position error.

18. The system of claim 12 wherein the conditional moments are calculated to include measurement nonlinearities in the correlator output functions.

19. The system of claim 12 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

20. The system of claim 12 wherein said estimator comprises:
- a signal power estimator for determining radio navigation data signal power based on correlator moments; and
- a noise power estimator for estimating noise power based on the correlator moments and said signal power estimate.

21. An estimator for estimating signal and noise power in a system for determining a multidimensional navigation state for a navigation platform based on radio navigation data embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, said estimator comprising:
- a signal power estimator for determining radio navigation data signal power based on correlator moments;
- a noise power estimator for estimating noise power based on the correlator moments and said signal power estimate; and
- a nonlinear filter for calculating said correlator moments, which represent statistical expectations of nonlinear functions of line-of-sight position errors.

22. The estimator of claim 21 further comprising a bias estimator for determining a bias estimate of each correlator in the bank, and wherein the signal power estimate and noise power estimate are further based on the bias estimate.

23. The estimator of claim 22 wherein the bias estimator comprises:
- a smoothing function for updating the bias estimate of each correlator according to a smoothing time constant; and
- a minimum function for determining the bias estimate as the minimum value of the smoothed bias estimates.

24. The estimator of claim 21 wherein said correlator moments comprise a first conditional moment comprising a conditional mean.

25. The estimator of claim 21 wherein the noise power estimate comprises a vector, such that an independent noise power estimate is calculated for each correlator in the correlator bank.

26. The estimator of claim 21 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

27. The estimator of claim 21 further comprising an inertial sensor unit for generating inertial data indicative of the inertial behavior of the platform and wherein the conditional moment of the navigation state is further calculated as a function of the inertial data.

28. The estimator of claim 21 wherein the radio navigation data comprises Global Positioning System (GPS) data, and wherein the radio navigation data receiver comprises a GPS receiver.

29. A measurement update unit for updating a navigation state and error covariances of the navigation state of a navigation platform based on radio navigation data transmitted by external terminals and embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, said measurement update unit comprising:
- a state update unit including a nonlinear filter, said state update unit for updating the navigation state as a function of the correlator output functions weighted by state gain functions, the state gain functions being based on a set of correlator moments, which are calculated with said nonlinear filter and which represent statistical expectations of nonlinear functions of line-of-sight position error, a propagation of a previous navigation state, and an error covariance matrix; and an error covariance matrix update unit for updating the error covariances of the navigation state based on the correlator moments.

30. The measurement update unit of claim 29 wherein the propagation of the previous navigation state comprises an inertial data propagation.

31. The measurement update unit of claim 29 wherein the statistical expectations of nonlinear functions of the line-of-sight position error are functions of the error covariances of the navigation state and the noise.

32. The measurement update unit of claim 29 wherein the state gain functions and error covariances of the navigation state are further based on estimates of the radio navigation data signal power and noise power.

33. The measurement update unit of claim 32 wherein said radio navigation data signal power estimate and noise power estimate are calculated by an estimator comprising:
  a signal power estimator for determining radio navigation data signal power based on the correlator moments; and
  a noise power estimator for estimating noise power based on the correlator moments and said signal power estimate.

34. The measurement update unit of claim 29 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

35. The measurement update unit of claim 29 wherein the radio navigation data comprises Global Positioning System (GPS) data, and wherein the radio navigation data receiver comprises a GPS receiver.

36. The measurement update unit of claim 29 wherein the line-of-sight error comprises the difference between a measured and an estimated line-of-sight range between the receiver and the external terminals.

37. A measurement update unit for updating a navigation state and error covariances of the navigation state of a navigation platform based on radio navigation data carried on a radio navigation data carrier signal embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, said bank of correlators including a prompt correlator for processing radio navigation data signals near the radio navigation data carrier frequency, said measurement update unit comprising:
  a state update unit including a nonlinear filter, said state update unit for updating the navigation state as a function of the prompt correlator output function weighted by state gain functions, the state gain functions being based on a set of correlator moments which are calculated with said nonlinear filter and which represent statistical expectations of nonlinear functions of line-of-sight position error, and an error covariance matrix;
  an error covariance matrix update unit for updating the error covariances of the navigation state based on the correlator moments; and
  an integrity management unit for maintaining the integrity of the navigation state and the error covariances.

38. The measurement update unit of claim 37 wherein the state gain functions are further based on estimates of the radio navigation data carrier signal power and noise power, a data bit estimate, an inertial data propagation of a previous navigation state and an error covariance matrix.

39. The measurement update unit of claim 37 wherein the noise power is calculated based on the average noise power in at least two non-prompt correlator output functions.

40. The measurement update unit of claim 37 wherein the state update unit and error covariance matrix update unit operate linearly for a relatively large radio navigation data carrier signal power to noise power ratio and operate nonlinearly for a relatively small radio navigation data carrier signal power to noise power ratio.

41. The measurement update unit of claim 37 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

42. A measurement update unit for updating a navigation state and error covariances of the navigation state of a navigation platform based on radio navigation data embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, said measurement update unit comprising:
  a state update unit for updating the navigation state as a function of the correlator output functions weighted by state gain functions, the state gain functions being based on a set of correlator moments which are statistical expectations of nonlinear functions of line-of-sight position error variance, a propagation of a previous navigation state and an error covariance matrix;
  an error covariance matrix update unit for updating the error covariances of the navigation state based on the correlator moments; and an integrity management unit for maintaining the integrity of the navigation state and the error covariances.

43. The measurement update unit of claim 42 wherein the propagation of the previous navigation state comprises an inertial data propagation.

44. The measurement update unit of claim 42 wherein the state gain functions and error covariances of the navigation state are further based on estimates of the radio navigation data signal power and noise power.

45. The measurement update unit of claim 42 wherein the line-of-sight position error is a function of the error covariances of the navigation state and the noise, and wherein the integrity management unit monitors and limits the signal and noise power estimate values.

46. The measurement update unit of claim 42 wherein the integrity management unit limits growth rate of the error covariances.

47. The measurement update unit of claim 46 wherein the inertial data is sensed by inertial data sensors and wherein the growth of the error covariances are limited to an upper bound based on estimated accuracy of the inertial sensors.

48. The measurement update unit of claim 42 wherein the integrity management unit monitors and maintains the positive-definiteness of the error covariance matrix.

49. The measurement update unit of claim 42 wherein the integrity management unit limits estimated change of the navigation state.

50. A method for determining a multidimensional navigation state for a navigation platform based on radio navigation data transmitted by external terminals comprising:

receiving and amplifying said radio navigation data embedded in noise at a radio navigation data receiver;

extracting said radio navigation data from said noise over an extended range of delay error at an extended-range bank of correlators, said correlators processing said radio navigation data and said noise to generate correlator output functions indicative of degree of correlation for each correlator in the extended-range bank between said radio navigation data and a known internal replica signal;

estimating the radio navigation data signal power and noise power from the correlator output functions;

updating the navigation state using a set of correlator moments, the calculation being based on the estimated radio navigation data signal power and noise power, and the correlator output functions; and calculating said correlator moments, which represent statistical expectations of nonlinear functions of line-of-sight position errors, with a nonlinear filter.

51. The method of claim 50 wherein the radio navigation data comprises Global Positioning System (GPS) data, and wherein the radio navigation data receiver comprises a GPS receiver.

52. The method of claim 50 further comprising applying a dynamical model to the navigation state to generate a propagated navigation state to be updated.

53. The method of claim 52 further comprising applying sensed inertial data indicative of the inertial behavior of the platform to the dynamical model.

54. The method of claim 50 further comprising updating the navigation state based on auxiliary sensor data.

55. The method of claim 54 wherein the auxiliary data is selected from the group of data types consisting of inertial data, altimeter data, radar data, and electro-optical device data.

56. The method of claim 50 wherein the multidimensional navigation state includes information selected from the group consisting of position, velocity, attitude, receiver clock errors, inertial sensor errors, propagation delays, and satellite errors.

57. The method of claim 50 further comprising updating the navigation state by calculating the conditional moments of the navigation state based on the estimated radio navigation data signal power and noise powder and the correlator outputs.

58. The method of claim 57 wherein the conditional moments are calculated to include measurement non-linearities in the correlator output functions.

59. The method of claim 50 further comprising generating an estimated time delay.

60. The method of claim 50 further comprising generating an estimated phase.

61. The method of claim 50 wherein estimating comprises estimating radio navigation data signal power based on the correlator moments; and estimating noise power based on the correlator moments and said signal power estimate.

62. A method for determining a multidimensional navigation state for a navigation platform based on radio navigation data transmitted by external terminals comprising:

receiving and amplifying said radio navigation data embedded in noise at a radio navigation data receiver;

extracting said radio navigation data from said noise over a range of delay error at a bank of correlators, said correlators processing said radio navigation data and said noise to generate correlator output functions indicative of degree of correlation for each correlator between said radio navigation data and a known internal replica signal;

estimating the radio navigation data signal power and noise power from the correlator output functions;

updating the navigation state based on the conditional moments of the navigation state calculated using a set of correlator moments as a function of the estimated radio navigation data signal power and noise power, and the correlator outputs;

calculating said correlator moments, which represent statistical expectations of nonlinear functions of line-of-sight position errors, with a nonlinear filter.

63. The method of claim 62 further comprising generating inertial data indicative of the inertial behavior of the platform and wherein the conditional moments of the navigation state are further calculated as a function of the inertial data.

64. The method of claim 62 wherein the radio navigation data comprises Global Positioning System (GPS) data, and wherein the radio navigation data receiver comprises a GPS receiver.

65. The method of claim 62 further comprising applying a dynamical model to the navigation state to generate a propagated navigation state to be updated.

66. The method of claim 65 further comprising applying sensed inertial data indicative of the inertial behavior of the platform to the dynamical model.

67. The method of claim 62 further comprising updating the navigation state based on auxiliary sensor data.

68. The method of claim 67 wherein the auxiliary data is selected from the group of data types consisting of inertial data, altimeter data, radar data, and electro-optical device data.

69. The method of claim 62 wherein the multidimensional navigation state includes information selected from the group consisting of position, velocity, attitude, receiver clock errors, inertial sensor errors, propagation delays, and satellite errors.

70. The method of claim 62 wherein said conditional moments are calculated to include measurement non-linearities in the correlator output functions.

71. The method of claim 70 wherein the bank of correlators comprises art extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

72. The method of claim 62 wherein estimating comprises:

estimating radio navigation data signal power based on the correlator moments; and estimating noise power estimator for estimating noise power based on the correlator moments and said signal power estimate.

73. A method for estimating signal and noise power in a system for determining a multidimensional navigation state for a navigation platform based on radio navigation data embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, comprising:

calculating correlator moments, which represent statistical expectations of nonlinear functions of line-of-sight position errors, with a nonlinear filter;

determining radio navigation data signal power based on the correlator moments; and estimating noise power based on the correlator moments and said signal power estimate.

74. The method of claim 73 further comprising determining a bias estimate of each correlator in the bank, and wherein the signal power estimate and noise power estimate are further based on the bias estimate.

75. The method of claim 74 further comprising determining the bias estimate according to the steps of:

updating the bias estimate of each correlator according to a smoothing time constant; and determining the bias estimate as the minimum value of the smoothed bias estimates.

76. The method of claim 73 wherein said correlator moments each comprise a first conditional moment comprising a conditional mean.

77. The method of claim 73 wherein the noise power estimate comprises a vector, such that an independent noise power estimate is calculated for each correlator in the correlator bank.

78. The method of claim 73 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

79. The method of claim 73 further comprising generating inertial data indicative of the inertial behavior of the platform and wherein the correlator moments are further calculated as a function of the inertial data.

80. The method of claim 73 wherein the radio navigation data comprises Global Positioning System (GPS) data, and wherein the radio navigation data receiver comprises a GPS receiver.

81. A method for updating a navigation state and error covariances of the navigation state of a navigation platform based on radio navigation data transmitted by external terminals and embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, the method comprising:

calculating correlator moments, which represent statistical expectations of nonlinear functions of line-of-sight position errors, a propagation of a previous navigation state and an error covariance matrix, with a nonlinear filter;

updating the navigation state as a function of the correlator output functions weighted by state gain functions, the state gain functions being based on a set of said correlator moments; and updating the error covariances of the navigation state based on the correlator moments.

82. The method of claim 81 wherein the propagation of a previous navigation state comprises an inertial data propagation.

83. The method of claim 81 wherein the line-of-sight position error is a function of the error covariances of the navigation state and the noise.

84. The method of claim 81 wherein the state gain functions and error covariances of the navigation state are further based on estimates of the radio navigation data signal power and noise power.

85. The method of claim 81 wherein said radio navigation data signal power estimate and noise power estimate are calculated by:

estimating radio navigation data signal power based on the correlator moments; and estimating noise power based on the correlator moments and said signal power estimate.

86. The method of claim 81 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

87. The method of claim 81 wherein the radio navigation data comprises Global Positioning System (GPS) data, and wherein the radio navigation data receiver comprises a GPS receiver.

88. The method of claim 81 wherein the line-of-sight error comprises the difference between a measured and an estimated line-of-sight range between the receiver and the external terminals.

89. A method for updating a navigation state and error covariances of the navigation state of a navigation platform based on radio navigation data carried on a radio navigation data carrier signal embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, said bank of correlators including a prompt correlator for processing radio navigation data signals near the radio navigation data carrier frequency, the method comprising:

updating the navigation state as a function of the prompt correlator output function weighted by state gain functions, the state gain functions being based on a set of correlator moments which are calculated with a nonlinear filter and which represent statistical expectations of nonlinear functions of line-of-sight position error, and an error covariance matrix; and updating the error covariances of the navigation state based on said state gain functions.

90. The method of claim 89 wherein the state gain functions are further based on estimates of the radio navigation data carrier signal power and noise power, a data bit estimate and an error covariance matrix.

91. The method of claim 89 wherein the noise power is calculated based on the average noise power in at least two non-prompt correlator output functions.

92. The method of claim 89 wherein the state update unit and error covariance matrix update unit operate linearly for a relatively large radio navigation data carrier signal power to noise power ratio and operate non-linearly for a relatively small radio navigation data carrier signal power to noise power ratio.

93. The method of claim 89 wherein the bank of correlators comprises an extended-range bank of correlators for extracting said radio navigation data from said noise over an extended range of delay error, said correlators processing said radio navigation data and said noise to generate correlator output functions indicative of degree of correlation for each correlator in the extended-range bank between said radio navigation data and a known internal replica signal.

94. A method for updating a navigation state and error covariances of the navigation state of a navigation platform based on radio navigation data embedded in noise, said radio navigation data signal being received by a radio navigation data receiver including a bank of correlators for extracting said radio navigation data from said noise over a range of delay error, said correlators processing said radio navigation data and said noise to generate correlator output functions indicative of degree of correlation for each correlator between said radio navigation data and a known replica signal, the method comprising:

updating the navigation state as a function of the correlator output functions weighted by state gain functions, the state gain functions being based on a set of correlator moments which are statistical expectations of nonlinear functions of line-of-sight position error, a propagation of a previous navigation state, and an error covariance matrix;

updating the error covariances of the navigation state based on the correlator moments; and maintaining the integrity of the navigation state and the error covariances.

95. The method of claim 94 wherein the propagation of the previous navigation state comprises an inertial data propagation.

96. The method of claim 95 further comprising sensing the inertial data by inertial data sensors and limiting the growth of the error covariances to an upper bound based on estimated accuracy of the inertial sensors.

97. The method of claim 94 wherein the state gain functions and error covariances of the navigation state are further based on estimates of the radio navigation data signal power and noise power.

98. The method of claim 94 wherein the line-of-sight position error is a function of the error covariances of the navigation state and the noise, and wherein maintaining comprises monitoring and limiting the signal and noise power estimate values.

99. The method of claim 94 wherein maintaining the integrity further comprises limiting growth rate of the error covariances.

100. The method of claim 94 wherein maintaining integrity further comprises monitoring and maintaining the positive-definiteness of the error covariance matrix.

101. The method of claim 94 wherein maintaining integrity further comprises limiting estimated change of the navigation state.

* * * * *